(12) United States Patent
Kondamuru et al.

(10) Patent No.: US 9,235,448 B2
(45) Date of Patent: Jan. 12, 2016

(54) SYSTEMS AND METHODS FOR BATCHABLE HIERARCHICAL CONFIGURATION

(75) Inventors: Ravi Kondamuru, Santa Clara, CA (US); Murali Raja, Santa Clara, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 711 days.

(21) Appl. No.: 12/277,675

(22) Filed: Nov. 25, 2008

(65) Prior Publication Data

US 2010/0131620 A1 May 27, 2010

(51) Int. Cl.
*G06F 15/16* (2006.01)
*G06F 15/177* (2006.01)
*G06F 9/50* (2006.01)

(52) U.S. Cl.
CPC ............ *G06F 9/5083* (2013.01); *G06F 15/16* (2013.01)

(58) Field of Classification Search
CPC ............................... G06F 15/16; G06F 15/177
USPC .................................................. 709/220–222
See application file for complete search history.

(56) References Cited

U.S. PATENT DOCUMENTS

| | | | |
|---|---|---|---|
| 5,386,466 A | 1/1995 | Bales et al. | |
| 6,128,279 A | 10/2000 | O'Neil et al. | |
| 6,711,171 B1 | 3/2004 | Dobbins et al. | |
| 6,725,262 B1 | 4/2004 | Choquier et al. | |
| 7,047,315 B1 * | 5/2006 | Srivastava | 709/238 |
| 7,086,061 B1 * | 8/2006 | Joshi et al. | 718/105 |
| 7,089,297 B1 | 8/2006 | Salas et al. | |
| 7,165,087 B1 * | 1/2007 | Graupner et al. | 709/202 |
| 7,451,359 B1 * | 11/2008 | Coekaerts | 714/48 |
| 7,496,651 B1 | 2/2009 | Joshi | |
| 7,729,353 B1 | 6/2010 | Podolsky | |
| 7,937,716 B2 | 5/2011 | Betts et al. | |

(Continued)

FOREIGN PATENT DOCUMENTS

| | | |
|---|---|---|
| WO | WO-02/44848 | 6/2002 |
| WO | WO-2007/064350 | 6/2007 |
| WO | WO-2008/112698 A2 | 9/2008 |

OTHER PUBLICATIONS

Cisco01; "Cisco Global Site Selector CLI-Based Global Server Load-Balancing Configuration Guide"; Mar. 2006; v1.3; pp. 1-465.*

(Continued)

*Primary Examiner* — Anthony Mejia
*Assistant Examiner* — Janakkumar Patel
(74) *Attorney, Agent, or Firm* — Foley & Lardner LLP; Christopher J. McKenna

(57) ABSTRACT

A centralized configuration of a Global Server Load Balancing (GSLB) site hierarchy may be batched across a plurality of appliances in a multi-site deployment. A single GSLB site hierarchy configuration may be distributed and operated on each appliance at each site. This reduces the configuration maintained for the multi-site deployment. Furthermore, in this manner, each appliance across multiple sites has an understanding of the entire topology of the multi-site deployment. Responsive to this configuration and understanding, each appliance may perform and optimize operations according to the site topology. For example, the appliances may selectively determine which sites to establish connections with in order to share metrics. In another example, appliances may select which remote sites to monitor services according to the topology.

20 Claims, 16 Drawing Sheets

(56) References Cited

U.S. PATENT DOCUMENTS

| | | | |
|---|---|---|---|
| 8,190,715 B1 | 5/2012 | Narayanaswamy et al. | |
| 2002/0052937 A1* | 5/2002 | Jager | 709/220 |
| 2004/0210653 A1 | 10/2004 | Kanoor et al. | |
| 2004/0267913 A1 | 12/2004 | Koneru | |
| 2006/0047792 A1* | 3/2006 | Dharmarajan et al. | 709/220 |
| 2006/0069776 A1* | 3/2006 | Shim et al. | 709/225 |
| 2007/0233851 A1 | 10/2007 | Ma | |
| 2010/0131622 A1* | 5/2010 | Brewis et al. | 709/221 |

OTHER PUBLICATIONS

Cisco02; "Cisco Global Site Selector Administration Guide"; Sep. 2008; v 3.0; pp. 1-274.*

Cisco01; "Cisco Global Site Selector CLI-Based Global Server Load-Balancing Configuration Guide"; Mar. 2006; v1.3; Cisco Systems, Inc.; pp. 1-465.

Cisco03; "Cisco Global Site Selector Getting Started Guide"; Sep. 2008; v3.0; Cisco Systems, Inc.; pp. 1-93.

International Preliminary Report on Patentability on PCT/US2009/065787 dated Jun. 9, 2011.

US Office Action on U.S. Appl. No. 12/277,690 dated Feb. 17, 2011.

US Office Action on U.S. Appl. No. 12/277,690 dated Jun. 13, 2011.

International Search Report on PCT/US2009/065787 dated Dec. 13, 2010.

Office Action on U.S. Appl. No. 12/277,690 dated Mar. 1, 2012.

Wollman W V et al: "Plug and play server load balancing and global server load balancing for tactical networks", 2003 IEEE Military Communications Conference, MILCOM 2003. Boston, MA, Oct. 13-16, 2003; [IEEE Military Communications Conference], New York, NY : IEEE, US LNKD—DOI: 10.1109/MILCOM.2003.1290280, vol. 2, Oct. 13, 2003, pp. 933-937, XP010698612, ISBN: 978-0-7803-8140-7 p. 933, right-hand column, line 13 p. 934, right-hand column, last line figures 1-3.

Written Opinion on PCT/US2009/065787 dated Dec. 13, 2010.

US Office Action on U.S. Appl. No. 12/277,690 dated Oct. 16, 2012.

US Office Action on U.S. Appl. No. 12/277,690 dated Dec. 16, 2013.

US Notice of Allowance in U.S. Appl. No. 12/277,690 Dtd Apr. 30, 2015.

US Office Action for U.S. Appl. No. 12/277,690 dated Dec. 26, 2014.

US Office Action for U.S. Appl. No. 12/277,690 dated Jun. 19, 2014.

* cited by examiner

SYSTEMS AND METHODS FOR BATCHABLE HIERARCHICAL CONFIGURATION

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE INVENTION

The present application generally relates to data communication networks. In particular, the present application relates to systems and methods for providing global server load balancing configuration among a plurality of site appliances.

BACKGROUND OF THE INVENTION

An application delivery controller may act as an intermediary between clients and servers. The application delivery controller may have multiple features for controlling or managing network traffic between the clients and servers. These features may be configured by an administrators. As the number of supported features of the application delivery controller grow, the administrator performs or is responsible for more configuration. As the application delivery controller is deployed in more, larger and different environments, the use of the application delivery controller becomes more complex as well as its configuration. In many enterprise infrastructures, multiple controllers may be deployed to handle different functionality. Each of these controllers may have a different configuration for which the administration maintains. An administrator of these application delivery controller may be challenged in configuring or maintaining a configuration of these controllers in any one or more environments.

BRIEF SUMMARY OF THE INVENTION

The present solution provides a centralized configuration of a Global Server Load Balancing (GSLB) site hierarchy that may be batched across a plurality of appliances in a multi-site deployment. A single GSLB site hierarchy configuration may be distributed and operated on each appliance at each site. This reduces the challenges of maintaining configuration for the multi-site deployment. Furthermore, in this manner, each appliance across multiple sites has an understanding of the entire topology of the multi-site deployment. Responsive to this configuration and understanding, each appliance may perform and optimize operations according to the site topology. For example, the appliances may selectively determine which sites to establish connections with in order to share metrics. In another example, appliances may select which remote sites to monitor services according to the topology.

In one aspect, the present invention is related to a method for configuring one or more global server load balancing (GSLB) appliances and one or more load balancing appliances via a single configuration to represent a GSLB site hierarchy. The method includes receiving by each appliances a configuration representing a GSLB site hierarchy. From the configuration, a first appliances identifies that the first appliance is a first GSLB site providing GSLB in the GSLB site hierarchy. From the configuration, a second appliance identifies that the second appliance is providing load balancing for a plurality of servers at a second site in the GSLB site hierarchy. The second also identifies from the configuration that the first GSLB site is a parent node in the GSLB site hierarchy to the second appliance.

In some embodiments, each of the appliances receive the configuration identifying peer GSLB nodes in the GSLB site hierarchy. In another embodiments, each of the appliances receives the configuration identifying one or more child nodes of one or more sites of the plurality of sites and a parent node of a GSLB site for each of the one or more sites. In one embodiment, the first appliance identifies from the configuration one or more peer GSLB sites. In another embodiment, the second appliance identifies from the configuration one or more parent nodes in the GSLB site hierarchy that are peer GSLB sites to the parent node of the second site of the second appliance. In some embodiments, the second appliance identifies from the configuration one or more child nodes in the GSLB site hierarchy that are child nodes to a third site. The second appliance may identify from the configuration a second child node to the parent node of the second appliance. Responsive to the configuration, the first appliance and second appliance may establish a metric exchange connection between the first appliance and the second appliance. In some embodiments, the second appliance responsive to the configuration does not accept a request for a metric exchange connection from a child node in a second site in the plurality of sites. In another embodiment, responsive to the configuration, the first appliance and one or more applications that are peer nodes of the first GSLB site establish a metric exchange connection between.

In another aspect, the present invention is related to a system for configuring one or more global server load balancing (GSLB) appliances and one or more load balancing appliances via a single configuration to represent a GSLB site hierarchy. The system includes appliances on one or more networks. Each appliance has a configuration interface for receiving a configuration representing a GSLB site hierarchy. A first appliance identifies from the received configuration that the first appliance comprises a first GSLB site providing GSLB for a plurality of sites in the GSLB site hierarchy. A second appliance identifies from the received configuration that the second appliance comprises a second site in the GSLB site hierarchy that provides load balancing for a plurality of servers at the second. The second appliance also identified from the received configuration that the first GSLB site of the first appliance is a parent node in the GSLB site hierarchy to the second site of the second appliance.

In some embodiments of the system, the configuration interface of each of the appliances receives the configuration identifying peer GSLB nodes in the GSLB site hierarchy. In another embodiment, the configuration interface of each of the appliances receives the configuration identifying one or more child nodes of one or more sites of the plurality of sites and a parent node of a GSLB site for each of the one or more sites. In one embodiment, the first appliance identifies from the received configuration one or more peer GSLB sites. In some embodiments, the second appliance identifies from the received configuration one or more parent nodes in the GSLB site hierarchy that are peer GSLB sites to the parent node of the second site of the second appliance. The second appliance may also identify from the received configuration one or more child nodes in the GSLB site hierarchy that are child nodes to a third site. In some embodiments, the second appliance identifies from the received configuration a second child node to the parent node of the second appliance.

The first appliance and the second appliance may establish responsive to the configuration, a metric exchange connection between the first appliance and the second appliance. The second appliance responsive to the configuration may not accept a request for a metric exchange connection from a child node in a second site in the plurality of sites. In some embodiments, the first appliance and one or more appliances that are peer nodes of the first GSLB site may establish a metric exchange connection between responsive to the configuration The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
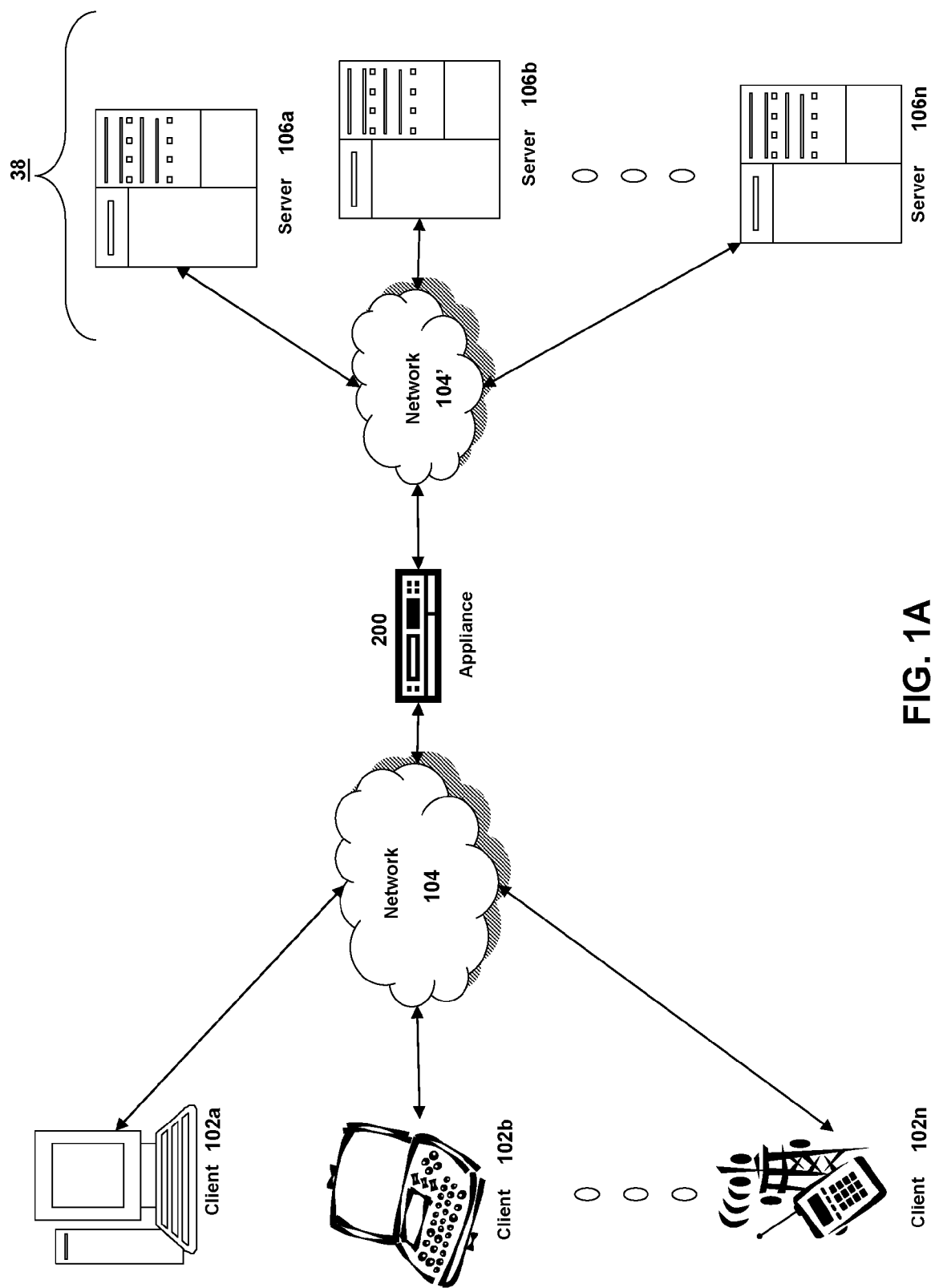
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes systems and method of providing a Global Server Load Balancing (GSLB) batchable and hierarchical configuration among a plurality of sites;

Section E describes systems and method of providing automatic synchronization of Global Server Load Balancing (GSLB) configuration among a plurality of appliances.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
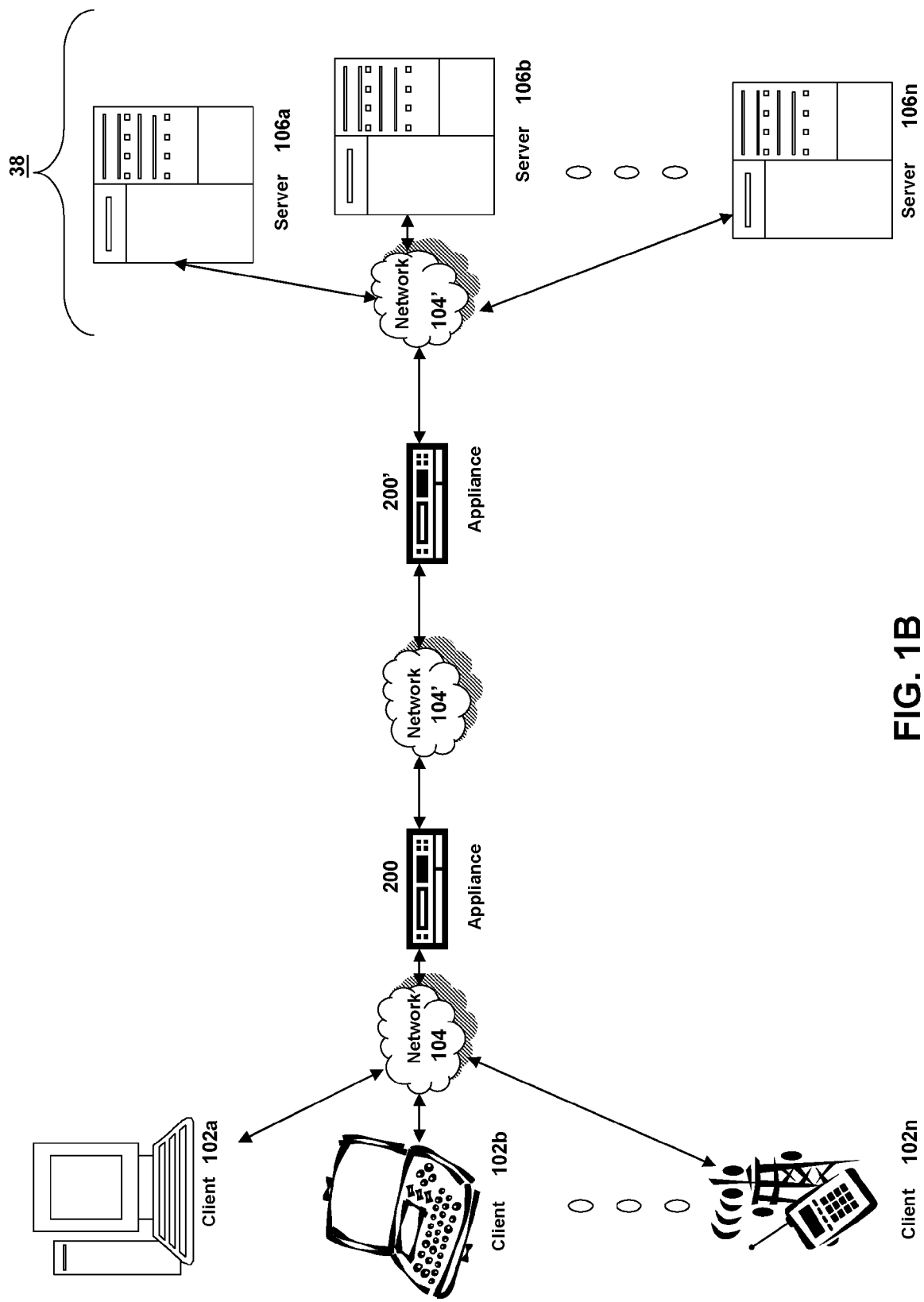
FIG. 1B is a block diagram of an embodiment of an environment for delivering a computing environment from a server to a client via an appliance.
Figure 1C:
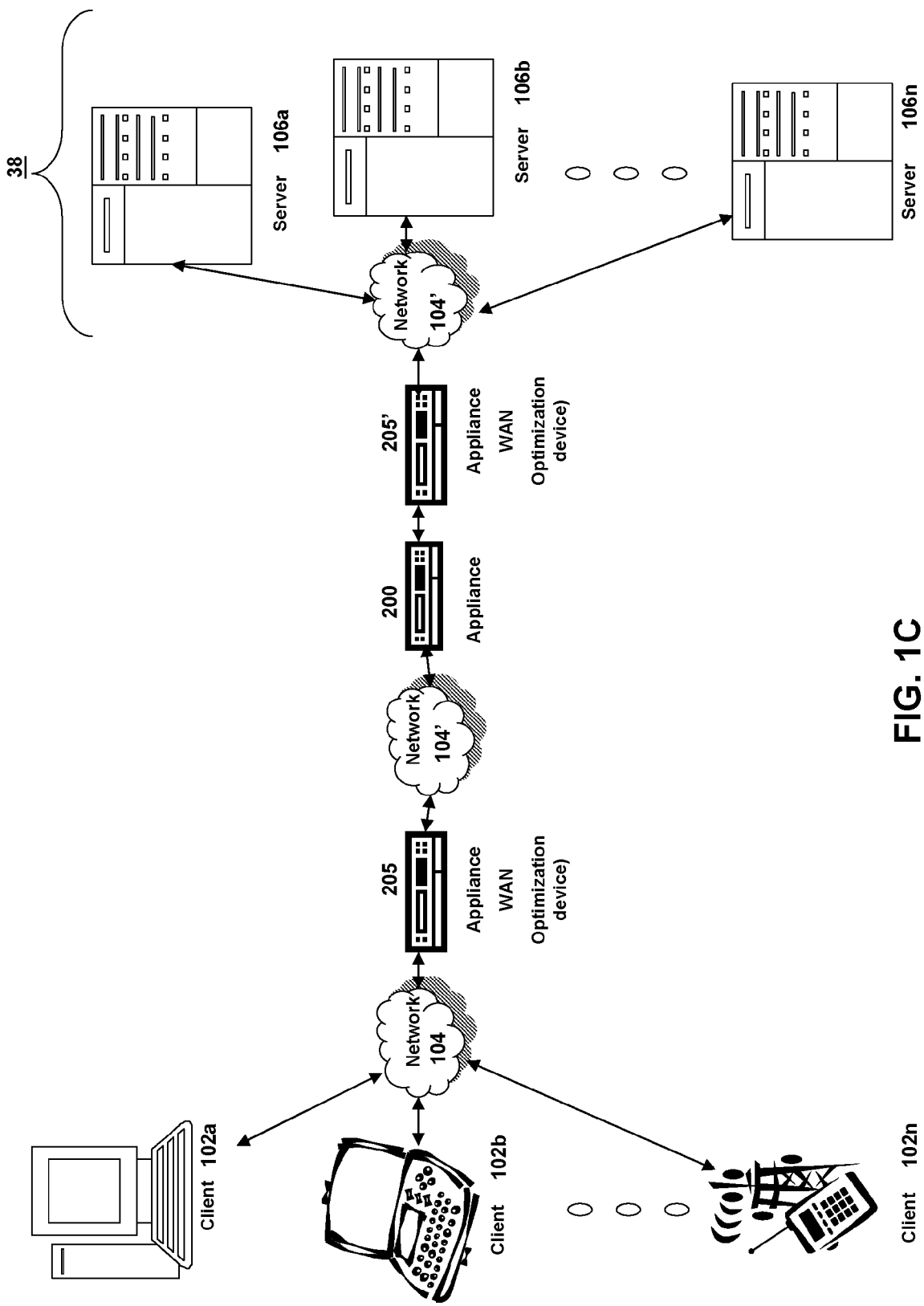
FIG. 1C is a block diagram of another embodiment of an environment for delivering a computing environment from a server to a client via a plurality of appliances.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
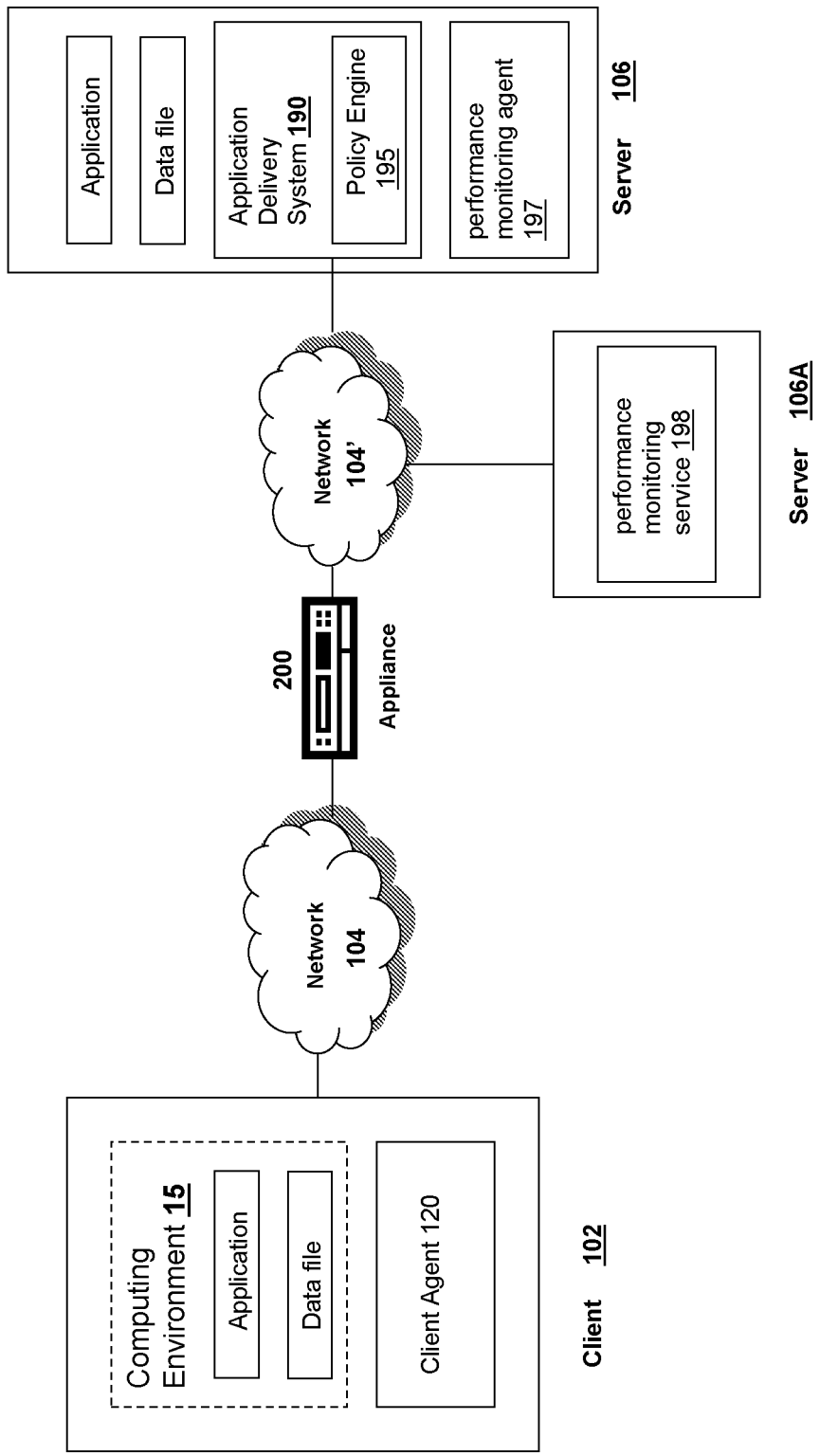
FIG. 1D is a block diagram of another embodiment of an environment for delivering a computing environment from a server to a client via.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif.

In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
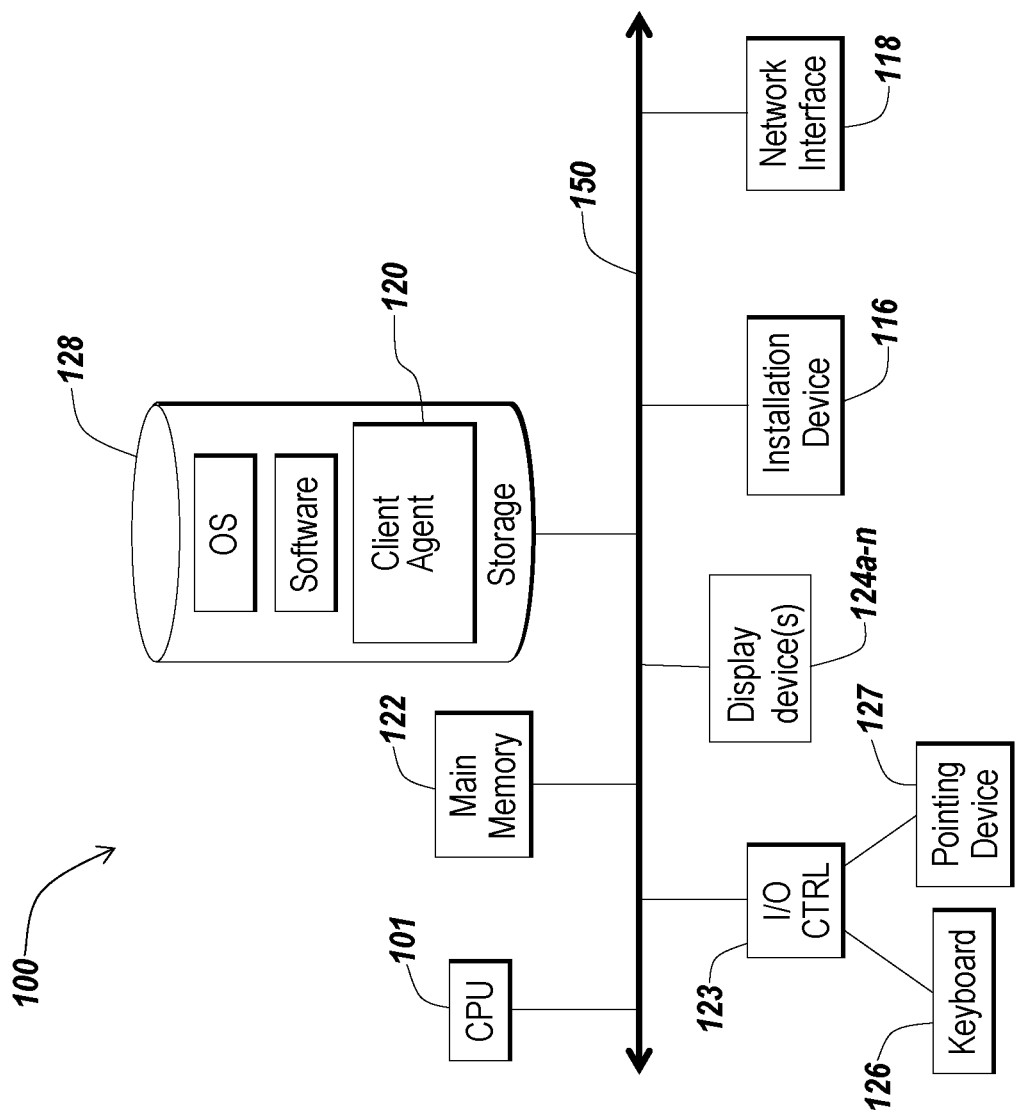
FIGS. 1E and 1F are block diagrams of embodiments of a computing device.
Figure 1F:
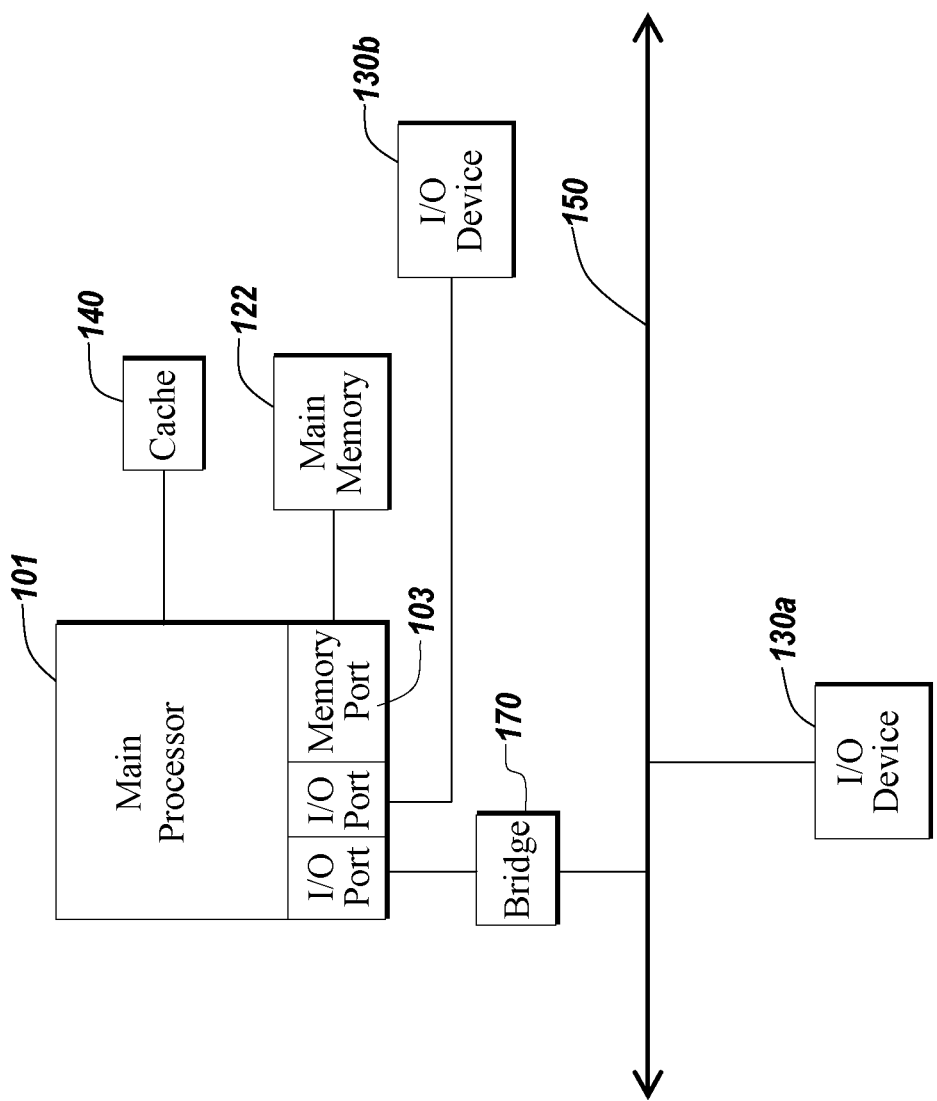

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
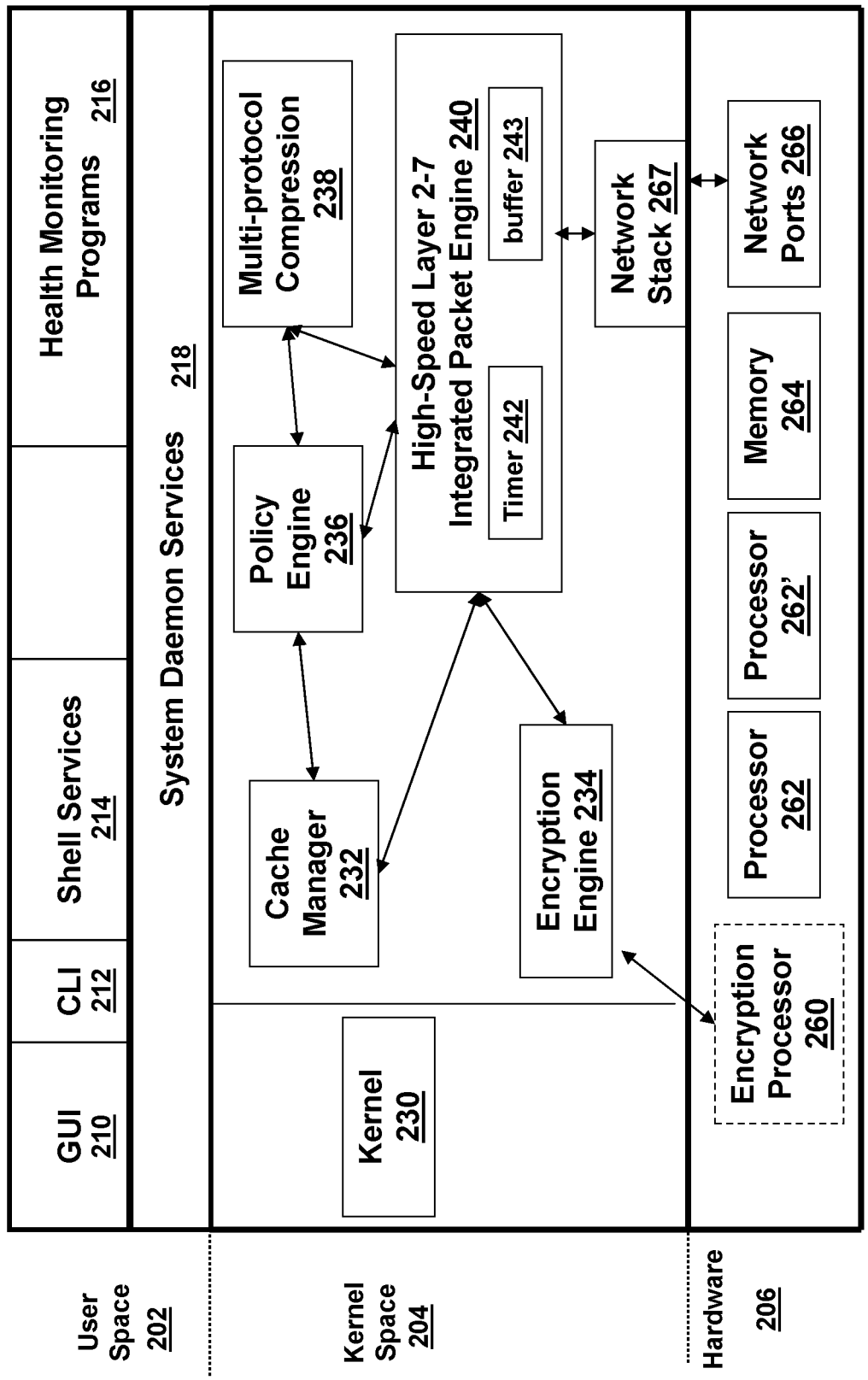
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer

242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
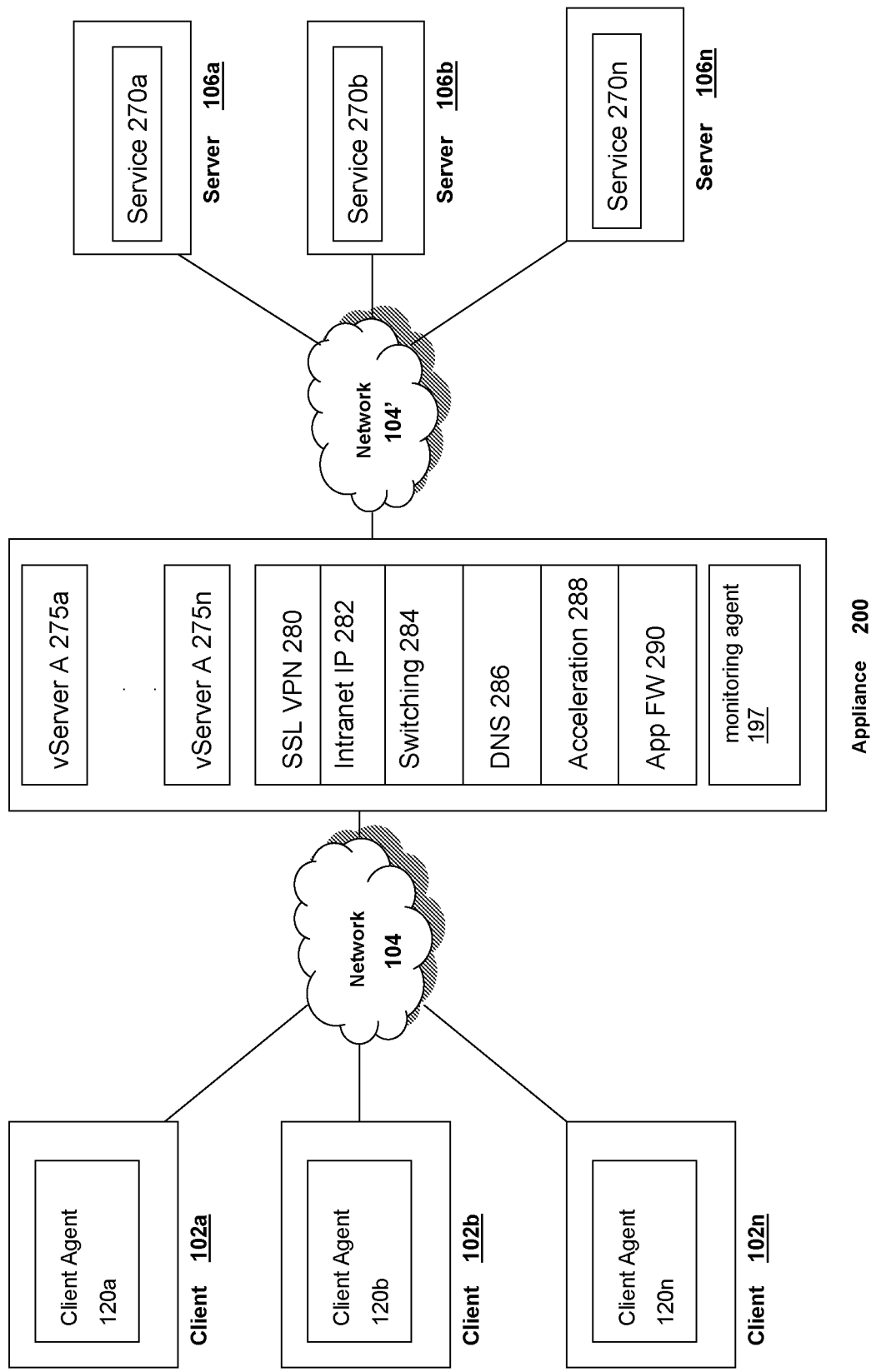
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
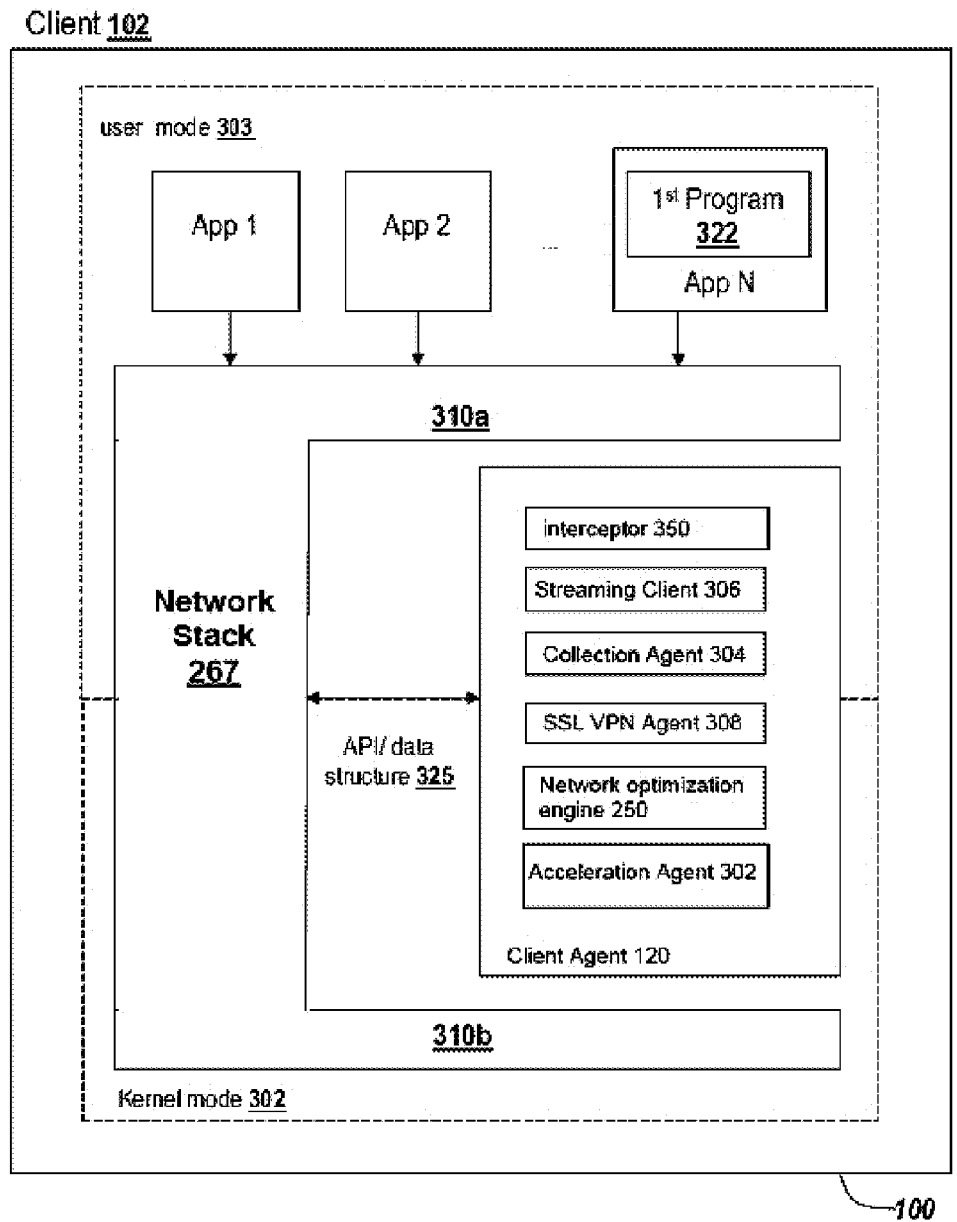
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-

310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. GSLB Batchable and Hierarchical Site Configuration

Figure 4A:
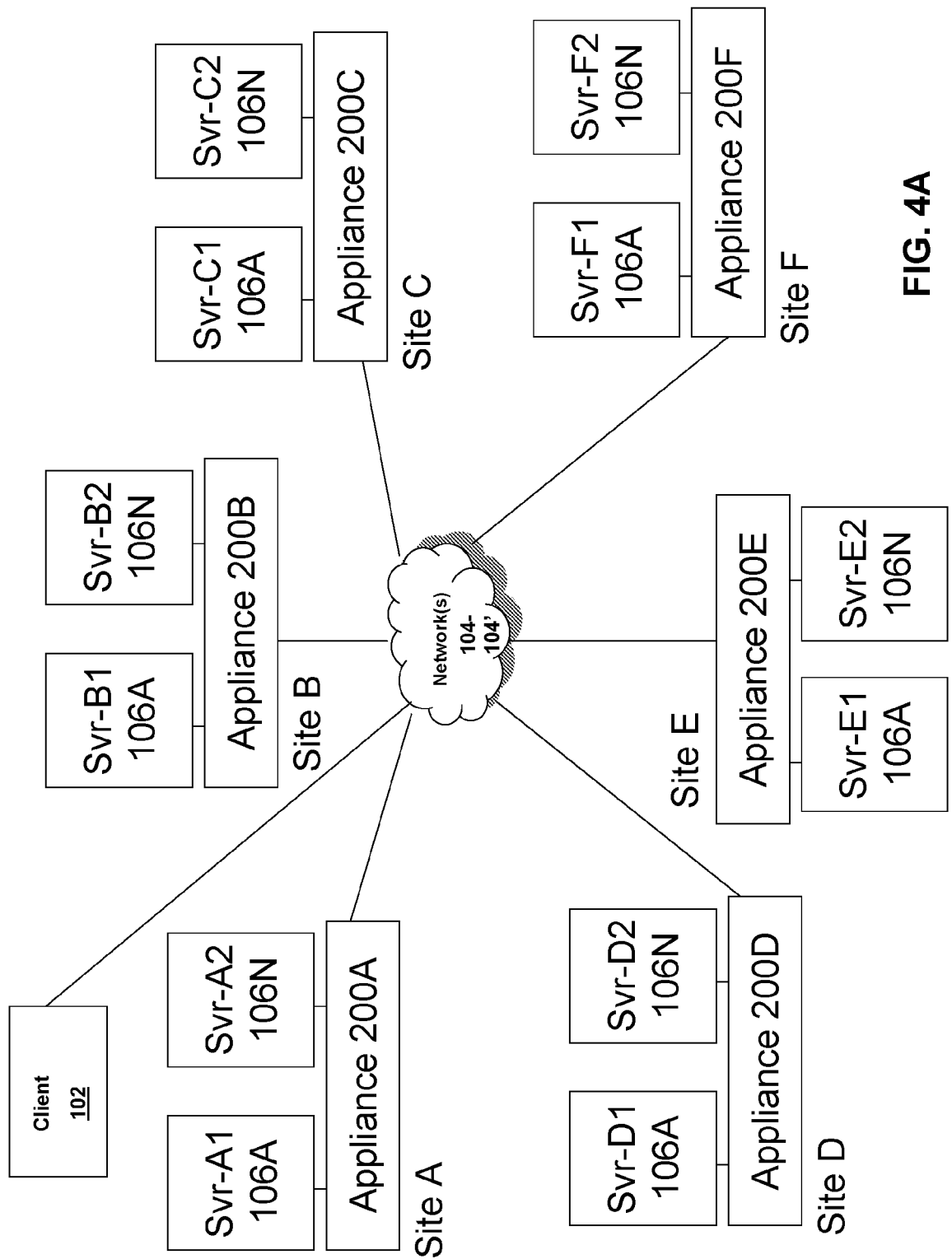
FIG. 4A is a block diagram of an embodiment of an environment of a multi-site deployment of appliances.

Referring now to FIG. 4A, an embodiment of an environment of a multi-site deployment of appliances is depicted. In brief overview, the deployment may include a plurality of sites, such as Site A, Site B, Site C, Site D, Site and Site F. Each of the sites may include one or more appliances 200A-200F. A client 102 may access or communicate with any one or more servers via any one or more appliances. Each of these appliances may provide any type and form of services, control or management of the client's access to one of more servers 106A-106N. Any of the appliances may communicate with any other appliance or a client via one or more networks 104-104'.

In further details of the example embodiment of FIG. 4A, Site A comprises appliance 200A managing multiple servers, server Svr-A1 through server Svr-A2. Site B comprises appliance 200B managing multiple servers, server Svr-B1 through server Svr-B2. Site C comprises appliance 200C managing multiple servers, server Svr-C1 through server Svr-C2. Site D comprises appliance 200D managing multiple servers, server Svr-D1 through server Svr-D2. Site E comprises appliance 200E managing multiple servers, server Svr-E1 through server Svr-E2 and Site F comprises appliance 200F managing multiple servers, server Svr-F1 through server Svr-F2.

In some embodiments, the multi-site deployment of FIG. 4 may represent a global server load balancing (GSLB) deployment. One or more of the appliances may be configured or designed and constructed to provide global server load balancing, and sometimes are referred to GSLB or GSLB appliances. A GSLB appliance may be designed and configured to received DNS requests from clients and resolve the domain name of the request to an internet protocol address of a selected appliance 200A-200F at any of the sites A-F. In processing the DNS request, the GSLB appliance may use any type and form of load balancing scheme to select a desired site and/or appliance for processing or handling a client request. By way of example, Site A appliance 200A and Site B appliance 200B may be configured as GSLB appliances which load balance clients and client request among Sites C, D, E and F, and in some embodiments, the appliances 200A and 200B also.

Any of the sites and appliances of the environment may be arranged, configured or deployed in any type and form of hierarchical or parent, child and/or peer relationship. Any one appliance or site may be a peer to another appliance or site. For example, appliance 200A may be a peer to appliance 200B for providing GSLB domain resolution services. Any one appliance or site may be a parent node of another appliance or site. For example, appliance 200A at Site A may be a parent site or appliance to appliance 200D of Site D. Any one appliance or site may be a child node of another appliance or site. For example appliance 200F at Site F may be a child node to Site B and appliance B.

Each of the appliances may be configured the same or differently from any other appliance. In some embodiments, multiple appliances providing GSLB domain name services may be configured the same. In other embodiments, multiple appliances providing GSLB domain name servicing may be configured differently. A Site may have multiple appliances, each appliance configured the same or differently. Appliances at one Site may be configured the same or differently as appliances at another site. In view of the functionality of an appliance previously described in connection with FIG. 2B, one appliance may be configured to provided acceleration and content switching while another appliance may be configured to provide AppFw and SSL VPN functionality. An appliance may be configured to provide the functionality of any of the embodiments of the appliance described herein, such as in conjunction with FIGS. 2A and 2B. In some embodiments, heterogeneous appliances may be deployed. For example, a first appliance may be provided as a product of a first manufacturer and a second appliance may be provided as a product of second manufacturer. In other embodiments, homogenous appliances may be deployed in which any version of the appliance is supplied by the same manufacturer. In some embodiments, any combination of heterogeneous and homogenous appliances may be deployed.

Figure 4B:
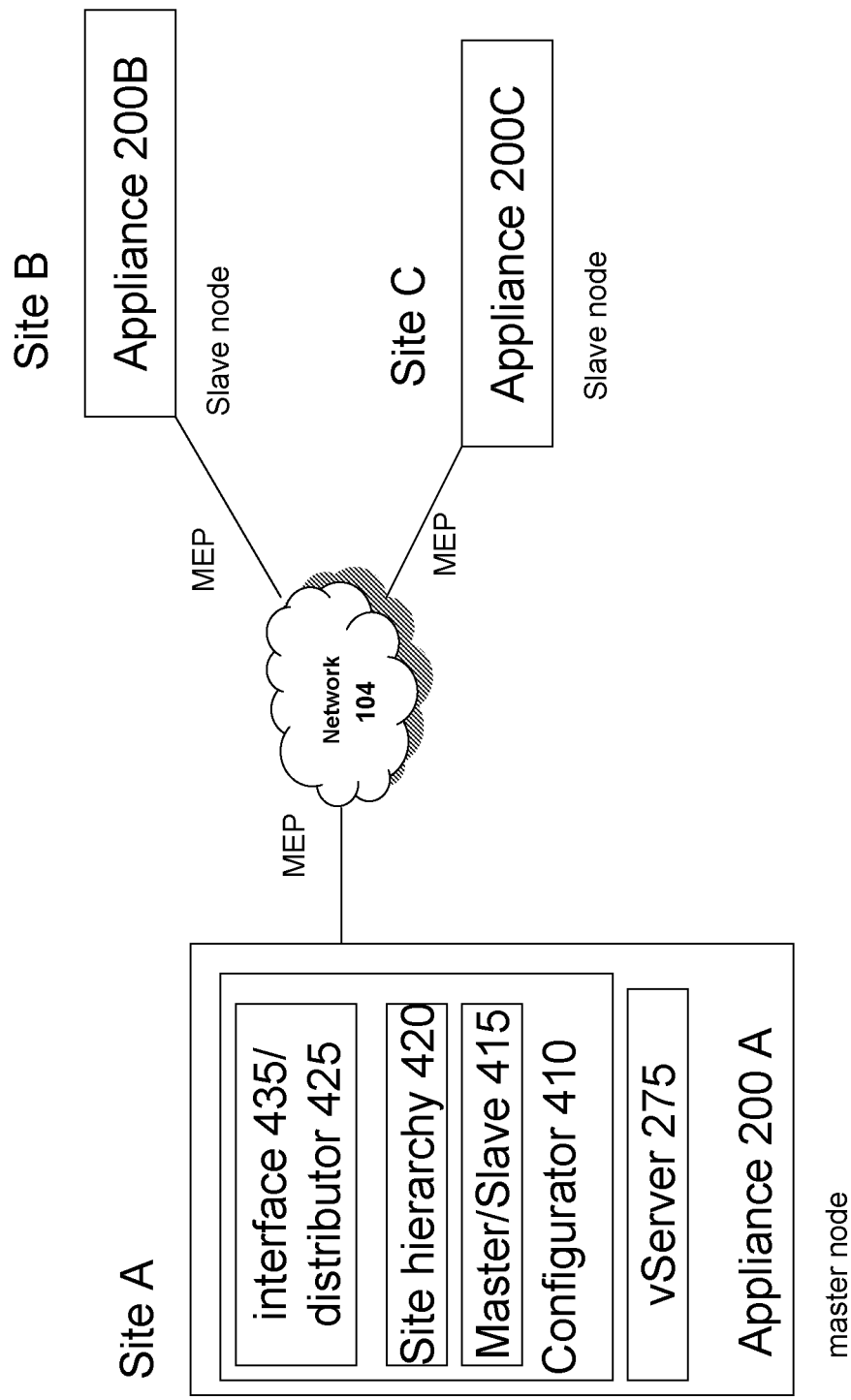
FIG. 4B is a block diagram of an embodiment of an appliance supporting batchable and hierarchical configuration for a multi-site deployment.

Referring now to FIG. 4B, an embodiment of an appliance to provide a batchable and/or hierarchical configuration of appliances in a multi-site deployment is depicted. In brief overview, the appliance 200A may comprise any embodiment of a vServer 275. The appliance and/or vServer may be configured to provide GSLB services for a multi-site deployment, such as load balancing Site B and Site C via one or more networks 104. The appliance may include a configurator 410. The configurator 410 may further include master/slave identification 415, a site hierarchy configuration 420 and a distributor 425. Via the configurator 410, the appliance may be identified as a master node by the master/slave identifier 415. The appliance 200A may be configured to have a site hierarchy configuration 420 comprising identification and configuration of all the nodes in the multi-site deployment, such as in FIG. 4A. This site hierarchy configuration 420 may be distributed, applied or published to other appliances via a distributor 425.

In further details, the configurator 410 may comprise any type and form of function, operations or logic for configuring a vServer 275. The configurator 410 may comprise software, hardware of any combination of software and hardware. The configurator 310 may comprise an application, program, library, script, process, service, task, thread or set of executable instructions. The configurator may comprise any type and form of user interface. In one embodiment, the configurator 410 comprises a command line interface. In another embodiment, the configurator 410 comprises a graphical user interface. In some embodiments, the configurator 410 comprises a graphical user interface and a command line interface. The configurator 410, for example, may include the CLI 212 and/or GUI 210 of embodiments of the appliance described in conjunction with FIG. 2B. In some embodiments, the configurator is part of the vServer 275. In other embodiments, the configurator interfaces to or communicates with vServer 275.

The configurator 410 may configure any of the features, operations or functionality of any of the embodiments of the appliance described herein. The configurator 410 may establish and/or configure one or more vServers 275 of an appliance. The configurator 410 may identify the servers and services that each vServer manages. In some embodiments, the configurator 410 establishes and configures a vServer to be a GSLB vServer that provides GSLB load balancing. The configurator 410 may identify services provided via other appliances as a remote service of the GSLB server. In other embodiments, the configurator 410 establishes and configures a vServer to be a load balancing vServer, such as for servers at a Site. The configurator 410 may identify on the appliance the services of the servers managed by the appliance.

The configurator 410 may configure a site hierarchy 420 for a multi-appliance or multi site deployment. The site hierarchy 420 identify the relationships between sites and/or appliances of sites in a multi-site deployment, such as for GSLB. For example, the configurator 410 may identify which appliances, sometimes referred to nodes, are parent, child and/or peer nodes. In some embodiments, a user via the configurator identifies an appliance as a parent site. In some embodiments, the user configures and identifies multiple parent sites. In some embodiments, the user identifies and configures one or more peer nodes as the top of a hierarchy of sites. The user may further identify and configure child nodes to these top peer nodes, which in turn may parent nodes to other appliances. In one embodiment, the user identifies and configures one or more appliances as child nodes to any one or more parent nodes. In some of these embodiments, the user identifies and configures a child node to be a parent to other children nodes. In some embodiments, one or more parent nodes below the top nodes may also be peer nodes. In another embodiment, one or more child nodes may also be peer nodes.

The site hierarchy 420 may be defined, specified or configured using any type and form of commands, instructions or data. These command, instructions or data may in a form readable, accessible or otherwise understood by the appliance and/or vServer. In some embodiments, the site hierarchy 420 comprises a set of configuration commands. In some embodiments, the site hierarchy 420 may comprise textual instructions and data. For example, in one embodiment, the site hierarchy 420 is a file. In some embodiments, the site hierarchy 430 comprises a list of command line commands or instructions to be processed by a user interface, such as CLI, of the appliance. In another embodiment, the site hierarchy 420 comprises one or more scripts or executables. In some embodiments, the site hierarchy 420 references or includes a reference to any one or more files. In many embodiments, the site hierarchy 420 includes one or more application programming interface (API) calls. The site hierarchy 420 may be batchable in that a single configuration or file may be executed, run or established on a plurality of appliances.

The configurator 410 may include any type and form of mechanism 415 for identifying an appliance or vServer as a master node or slave node. The master identifier 415 may include any configuration data, setting, flag or parameter providing an identification of master. In some embodiments, a user may set a flag or parameter to identify the node as a master or slave. For example, in one embodiment, the user may selected a user interface element of a GUI to identify the appliance as a master. In another embodiment, the user may pass a parameter, value or set a flag on a command line command via the CLI to identify the node as master. In other embodiments, the site hierarchy 430 comprises data or configuration command to set a node as a master. In some embodiments, if the appliance is not identified as a master node then by default and without specific identification the appliance may be a slave node. In another embodiment, the appliance a user selects to perform the configuration for the multi-site deployment may be considered the master. In some embodiments, any of the peer GSLB nodes may be a master node. In another embodiment, multiple nodes may be a master node. In some cases, one node may be a backup master node to another node.

The distributor 425 may comprise any logic, operations or functionality to publish, distribute or otherwise provide a configuration to an appliance. In some embodiments, the distributor comprises any type and form of communication interface between appliances or between another computing device and the appliance. In some embodiments, the distributor may download, upload or file transfer a configuration file to an appliance. In other embodiments, the distributor may email a configuration to a computing device or appliance. In some embodiments, the distributor makes remote procedure calls, such as remote shell calls from one appliance to another appliance to distribute the configuration. In another embodiments, the distributor may write configuration to any type and form of computer readable medium. In another embodiments, the configuration is distributed via a connection and a protocol supported by the appliances, such as the Metric Exchange Protocol (MEP) described below. The distributor may distribute configuration via a secure call, command or connection, such as for example, a secure SSH, a secure copy SCP or a secure file transfer protocol (SFTP).

The interface 435 may comprise any logic, operations or functionality to receive and apply configuration information. In some embodiments, the interface may receive any configuration via a file. In another embodiment, the interface may receive a configuration via a metric exchange connection. In some embodiments, the interface may receive a configuration distributed by a distributor using any of the interface mechanism described above in conjunction with the distributor. In one embodiment, the interface may receive or apply configuration via any type and form of remote command, procedure or API calls. The interface may apply configuration to an appliance via a secure call, command or connection, such as for example, a secure SSH, a secure copy SCP or a secure file transfer protocol (SFTP). In some embodiments, the interface may received and apply configuration from a user via a graphical user interface or command line interface. In some embodiment, the interface is separate and distinct from the distributor. In other embodiment, the interface and distributor are combined into the same unit, logic or functionality.

An appliance may communicate with another appliance via any type and form of protocol. In some embodiments and as illustrated in FIG. 4B, the appliances communicate using any form of a metric exchange protocol (MEP), such as the MEP protocol provided by NetScaler appliances manufactured by Citrix Systems, Inc. of Ft. Lauderdale, Fla. The metric exchange protocol may be any transport layer protocol, any presentation layer protocol or any application layer protocol. In one embodiment, the appliances uses a Simple Network Management Protocol (SNMP) for communications. In another embodiment, the appliances use a common management information protocol (CIMP). Any of these protocols may be used by the appliances to communicate, exchange or provide any type and form of information, data, metrics and/or statistics about the configuration, performance and/or operation of the appliance or any component thereof.

In some embodiments, the appliance with the lower internet protocol address initiates the connection or makes the connection request. In other embodiments, the appliance with the higher internet protocol address initiates the connection or makes the connection request. In yet another embodiment, the appliance identified first or identified as a parent initiates the connection or makes the connection request. In one embodiment, the appliance identified as a child initiates or makes the connection request.

Figure 4C:
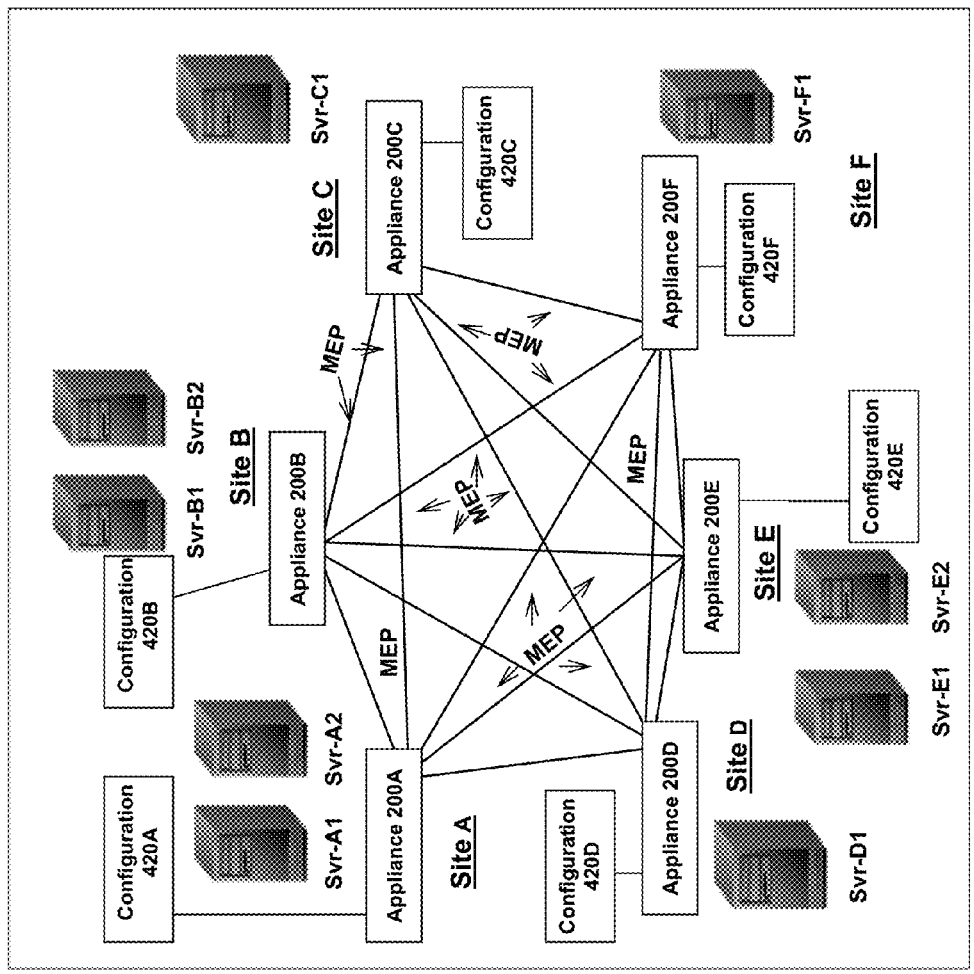
FIG. 4C is a block diagram of an embodiment of another embodiment of configurations and communications in one embodiment of a multi-site deployment.

Referring now to FIG. 4C, an embodiment of a multi-appliance and multi-site deployment is depicted. In brief overview, this multi-site configuration is based on a peer to peer relationship among all of the sites and appliances. Site A and appliance 200A is a peer node to each of the appliances at Sites B-F. Likewise, each of Site B, C, D and F are peer nodes to the other sites. Each appliance at each site has a separate and distinct configuration 420A-N. Based on the configuration and the peer to peer relationship, each appliance establishes and has a metric exchange connection with each of the peer appliances. In this embodiment of a type of hierarchy and configuration, all the appliances are communicating with and need to be configured to communicate with every other appliance.

In the example embodiment of FIG. 4C, each of the appliances have separate configuration. By way of example, the following table shows a configuration or portion thereof to identify each of the sites and nodes in the hierarchy of the multi-site deployment. The add command illustrated below has a syntax of:

add gslb<site identifier><internet protocol address>

This command adds a site to a gslb configuration and identifies the site by a site identifier and an internet protocol address. Any type and form of site identifier may be used including any text, numerics or alphanumeric based characters. The IP address may be any desired or supported IP address available via the networks of the deployment.

| # Configuration on Site A 420A |
|---|
| add gslb site-A IP-A |
| add gslb site-B IP-B |
| add gslb site-D IP-D |
| add gslb site-E IP-E |
| add gslb site-C IP-C |
| # Configuration on Site B 420B |
| add gslb site-A IP-A |
| add gslb site-B IP-B |
| add gslb site-C IP-C |
| # Configuration on Site-C 420C |
| add gslb site-A IP-A |
| add gslb site-B IP-B |
| add gslb site-C IP-C |
| add gslb site-F IP-F |
| # Configuration on Site D 420D |
| add gslb site-A IP-A |
| add gslb site-D IP-D |
| # Configuration on Site E 420E |
| add gslb site-A IP-A |
| add gslb site-E IP-E |
| # Configuration on Site-F 420F |
| add gslb site-C IP-C |
| add gslb site-F IP-F |

The above configuration lists a set of configuration commands in a format for an example embodiment of the appliance as a NetScaler appliance. Any other type and format of command or instruction may be used. As noted by each of the site specific configurations 420A-420F, in some embodiments, each site may only have a partial or limited view of the entire topology or GSLB hierarchy.

Figure 4D:
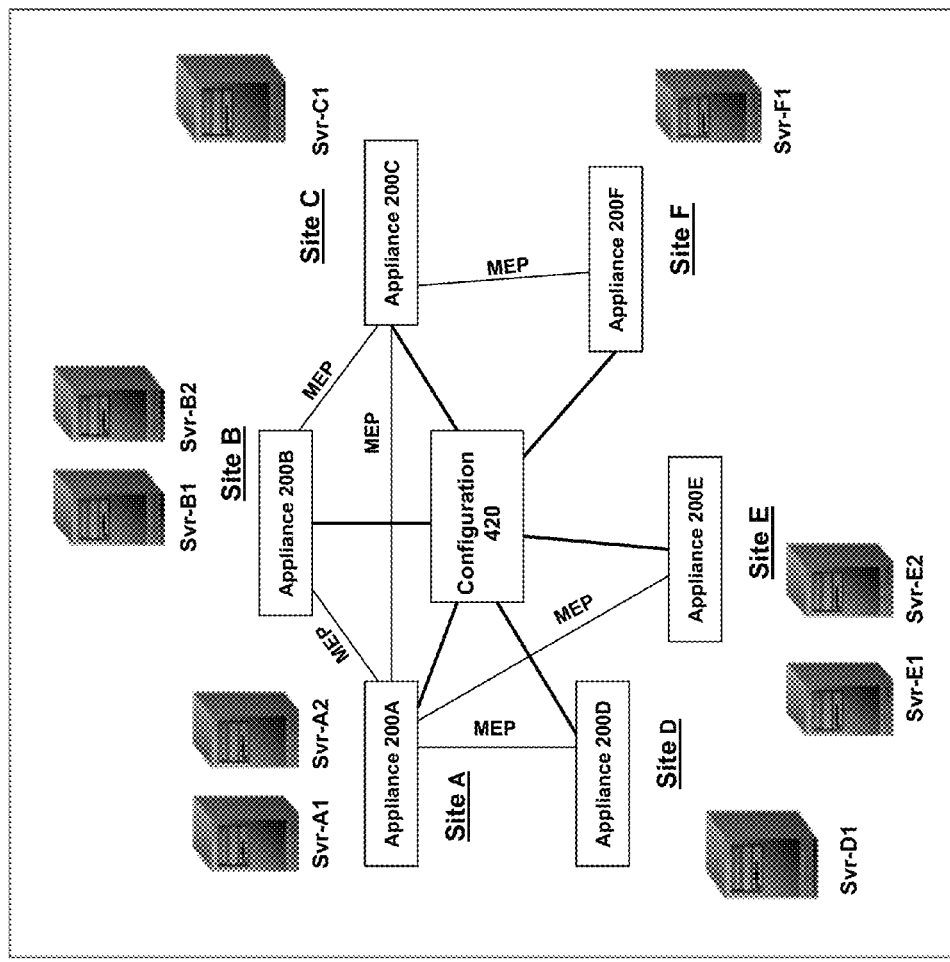
FIG. 4D is a block diagram of an embodiment of an embodiment of configurations and communications in an embodiment of a multi-site deployment using the batchable and hierarchical configuration.

Referring now to FIG. 4D, another embodiment of a multi-site deployment is depicted. In this embodiment, a centralized or single configuration 420 is used to configure the site hierarchy of each appliance. In this manner, each of the appliances may leverage a single configuration 420 to identify and understand the site hierarchy. In brief over, the site hierarchy of FIG. 4D includes three peering Sites A, B and C participating in GSLB. Sites D, E and F comprises sites acting as child nodes to one of the peering nodes.

For the topology depicted in FIG. 4D, the site hierarchy configuration may use an option for defining a site called the "parentSite". The parentSite identifies for a child node the site identifier of an established site, the parent node. With this option, a configuration can be created that will be batch-able across all the sites.

---

420

---

Define the 3 peering sites A, B, C participating in GSLB.

add gslb site-A IP-A
add gslb site-B IP-B
add gslb site-C IP-C
Define the sites acting as child nodes: D, E, F add gslb site-D IP-D -parentSite Site-A
add gslb site-E IP-E -parentSite Site-A
add gslb site-F IP-F -parentSite Site-C

---

Each of the appliances 200A-200F may execute and configure one or more vServers based on the site hierarchy configuration 420. Although illustrated with a format and parameter referred to as parentSite, other embodiments may uses parameter options to identify child nodes, such as -childSite or to identify peer nodes such as -peerSite.

With these options to identify nodes of a site hierarchy as peer, child and/or parent, the same configuration provides the logical relationship between sites and provides all the appliances with a complete GSLB site topology. With this type of site hierarchy configuration, each site knows which other sites to connect with. In some embodiments, this site hierarchy configuration identifies the immediate sites an appliance may reach via a network to connect with. In some embodiments, this type of site hierarchy configuration identifies those appliances or sits for received metrics or statistics via a metric exchange connection, such as a particular GSLB service's statistics. With this type of site hierarchy configuration which is batchable, in some embodiments, there may be no change made by a an administrator to the configuration that is deployed. That is, in some embodiments, the same GSLB site hierarchy configuration is applied to all of the appliances in the topology.

As illustrated in FIG. 4D, the number of connections between appliances has been reduced. With the site hierarchy configuration 420 identified the entire GSLB topology, every site and appliance has knowledge of the total site topology. With this information, an appliance may determine a desired or optimized metric exchange connectivity with other appliances. For example, in some embodiments, an appliance of child site only connects to an appliance of a parent site. In some embodiments, a parent site connects to peers that are patents and to any direct children nodes.

In some embodiments, a child site makes an metric exchange connection to a parent site. For example, appliance 200E at Site E may provide statistics via a connection to patent site of appliance 200A of Site A. The GSLB vServer of appliance 200A may use these statistics to perform load balancing among the sites. In some embodiments, the child site does connect to another child site. For example, appliance 200E may not connect to appliance 200D. In one embodiment, the child site does not accept any connections from a non-parent Site. For example, if appliance 200D attempts to connect to appliance 200E, the appliance 200E may reject, drop or otherwise not accept the connection request. In some embodiments, the child site only accepts connections from a direct parent site. In other embodiments, the child site accepts connections from another child site, a peer site or an indirect parent site.

For GSLB load balancing, statistics of the peer sites may be exchanged. For example, in FIG. 4D, appliance 200A of Site and appliance 200B of Site B and appliance 200C of Site C each have a metric exchange connection to each other. For statistics of services on child sites of peers, the parent sites provide this information. For example, appliance 200A obtains statistics from child sites appliance 200D and appliance 200E. Appliance 200A exchanges with appliances 200B and 200C the statistics from appliances 200D and 200E. Likewise, appliance 200C obtains statistics from appliance 200F and provides these statistics to appliances 200B and 200A. If a site or appliance does not identify a parent site, in some embodiments, the appliance identifies all sites as peers and connects to each of these sites.

If none of the sites configured has a parentSite, then all sites are considered as peers and every site has a metric exchange connection to the other.

In some embodiments, the hierarchy may have any number of levels. In other embodiments, the hierarchy may be limited to a predetermined number of levels. In one embodiments, a site hierarchy may be limited to total number of 32 sites participating in GSLB. By way of an example embodiment, the following are the characteristics of a site at a particular layer or level in the hierarchy.

An embodiment of a GSLB Site configuration (e.g., a parent site):

| | | |
|---|---|---|
| 1. DNS Config | Optional with a predetermined minimum | There should be a predetermined number of sites for example, 2 sites that have DNS configuration. DNS config allows for queries routed to these sites to be answered for domains that the appliance 200 does GSLB. |
| 2. LB Config | Optional | These sites can have load balancing, content switching or cache redirection configuration of the IP's participating in GSLB. In some embodiments, the may also not have any LB config also. In this case, they have all gslb services as remote services and may also have a DNS config. |

| | | |
|---|---|---|
| 3. GSLB Config | In some embodiments, required | GSLB Config 420 specifies the site configuration and identifies MEP connections to establish. MEP allows for stats to be collected So that when DNS queries are received, a decision can be made. To be given to other peers if asked for. |
| 4. MEP Connections | Established | A GSLB Sites established MEP to: Peer GSLB (parent) Sites Direct child sites. |
| 5. Maximum | Predetermined amount of sites, such as 32 | There can be a predetermined maximum number of sites in a given gslb config. |

An embodiment of LB Site configuration (e.g., child sites)

| | | |
|---|---|---|
| 1. DNS Config | In some embodiments, not-Required | In one embodiments, there is not any not any DNS configuration on these sites. In some embodiments, The design of the site config should be such that there should be not be necessary for a child site to have to process DNS queries. |
| 2. LB Config | In some embodiments, Required | These sites have LB/CS/CR config of the IP's participating in GSLB. |
| 3. GSLB Config | In some embodiments, Basic | Only basic gslb config is required on the child site. Only Add gslb site is done the child so that the child site knows the parent site to connect to. |
| 4. MEP Connections | Established | A LB Site establishes MEP to a parent site. |
| 5. Maximum | A predetermined maximum, such as 1024 | There can be a predetermined maximum number of sites, such as 1024 |

Although at times the site hierarchy is referenced to in the context of GSLB as a GSLB site hierarchy, many embodiments of the systems and methods described herein are applied to a multi-site or multi-appliance deployment regardless if a GSLB context/environment or not.

Figure 4E:
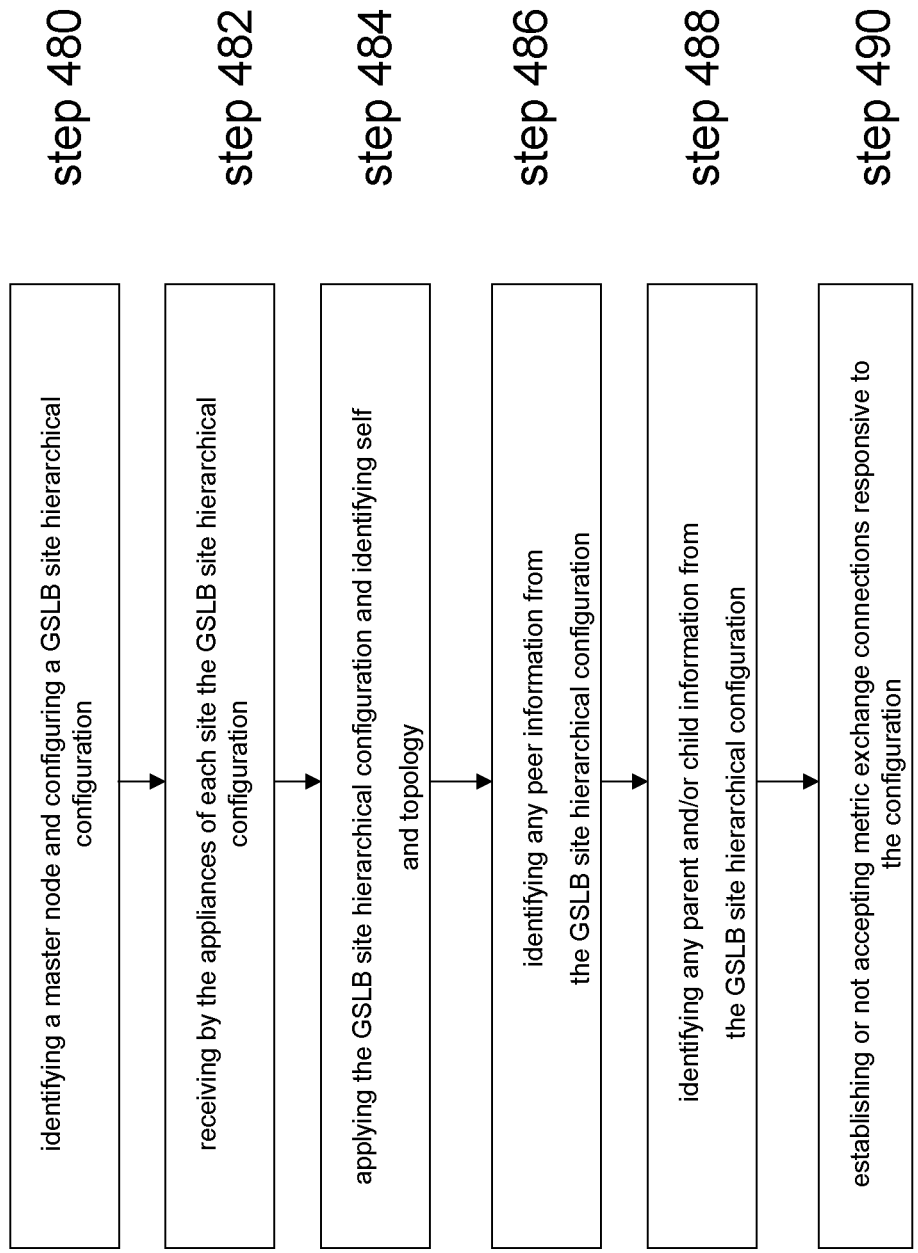
FIG. 4E is a flow diagram of an embodiment of steps of a method for configuring appliances of a multi-site deployment via a batchable and hierarchical configuration.

Referring now to FIG. 4E, an embodiment of a method of deploying a site hierarchy via a batchable configuration to each of the appliances in a multi-appliance deployment is depicted. In brief overview, at step 480, a GSLB site configuration is configured or provided on an appliance identified as a master node. At step 482, each of the appliances in the multiple sites receives a copy of the GSLB site hierarchy configuration. At step 484, each of the appliances apply the GSLB site hierarchy configuration and identify itself in the configuration. At step 486, each of the appliances identifies peer information from the GSLB site hierarchical configuration and step 488, each of the appliance identifies parent and child information from the GSLB site hierarchy configuration. At step 490, appliances establish metric exchange connections responsive to the configuration.

In further details, at step 480, a user may configure any type and form of site hierarchy, such as a GSLB site hierarchy, on any appliance in a multi-site deployment. A user may define or specify any topology for a GSLB site hierarchy with any combination of one or more peer sites, parent sites and/or child sites. In some embodiments, the user defines a site hierarchy with a single top node. In other embodiments, the user defines a site hierarchy with multiple peers nodes at the top of the hierarchy. The user may specify in the site hierarchy any number of levels of parent and child nodes. Each peer node may be a parent to any number of sites. Each site that is a child of a top node may also be parent node having any number of children and each child may further be a parent to any number of further children nodes.

A user, such as an administrator, may identify any appliance of any site as a master node for configuring the site hierarchy. In some embodiments, the user identifies a top node as a master node. In another embodiment, the user identifies an appliance that is a child of a parent site as the master node. In some embodiments, the user identifies a plurality of appliances as master nodes. In some cases, an appliance is designated as a backup master node. In some embodiments, the user specifies via configuration of the appliance that the appliance is a master. In another embodiment, an appliance is considered a master node because the user configures the site hierarchy on that appliance.

At step 482, any of the other appliances in the site hierarchy may receive a copy of the site hierarchy from a user, the master node or otherwise from another appliance. In some embodiments, a user or the appliance may distribute the site hierarchy 420 of the master node to each of the other appliances of the multi-site deployment. In some embodiments, the user transfers an electronic or computer readable copy of the site hierarchy via a computer readable medium from one appliance to another appliance. In one embodiment, a user configures any other appliance via the configuration on that appliance, such as via the CLI or GUI of the appliance. In another embodiment, the user or the master node publishes or distributes the site hierarchy via the distributor 425. In some embodiments, the user or the master node applies the site hierarchy to one or more appliances via the interface 435.

At step 484, each of the appliances receiving the site hierarchy executes or otherwise applies the configuration. An interface 435 on each appliance may receive the site hierarchy configuration and execute or apply each configuration command. The configurator 410 on each appliance may receive and apply each configuration command of the site hierarchy configuration. In some embodiments, the appliance or any portion thereof executes the site hierarchy configuration as a batchable script via the CLI of the appliance. In other embodiments, the configuration executes the site hierarchy as a batchable set of configuration commands. For example, either a CLI or GUI of the appliance may read in a site hierarchy configuration file and process each line in the file a configuration command. In some embodiments, an API call to the configurator causes the configurator to apply each of the configuration commands in the site hierarchy configuration.

The appliance applying the configuration may determine or recognize any references to the site identifier supported, hosted or otherwise provided via the appliance. The appliance may comprise any configuration that identifies an identifier of the site of the appliance. For example, the appliance 200A of Site A may have an identifier of Site A configured for the appliance. In some embodiments, the configurator or interface of the configuration when processing the site hierarchy configuration determines the one or more configuration commands that reference the site identifier configured for that appliance. In other embodiments, the configurator or interface of the appliance determines any configuration commands in the site hierarchy that reference the IP address supported, hosted or otherwise provided via the appliance. For example, appliance 200C may recognize that IP address IP-C is the IP address for itself when applying the site hierarchy configuration. In another embodiments, the appliances may use a combination of site identifier and IP address to recognize the configuration commands reference itself. In any of these manners, an appliance may determine where in the site hierarchy the appliance is configured based on the recognition of the appliances site identifier and/or IP address.

Based on this and any of the other Site, parent, peer and/or child information from the configuration, the appliance may determine an entire topology of the site represented by the site hierarchy configuration. In some embodiments, the appliance may determine based on order or location of configuration commands in the configuration the topology of the site. In some embodiments, the appliance may determine via the configuration based on parameters or options of configuration commands or lack thereof, the site topology. The appliance such as via configuration may store this site topology in any manner, such as via data structures or files, in memory or storage. In some embodiments, the appliance uses a tree based data structure for representing the site hierarchy.

At step 486, each of the appliances identifies any peer nodes from the configuration. During, upon or after applying the site hierarchy configuration, the appliance, such as via configurator, may determine the site identifier and/or IP address of any peer nodes to itself. For example, any top level GSLB site, such as Sites A, b and C in FIG. 4D may determine the other Sites at the same level in the hierarchy. In some embodiments, the appliance determines those Sites not identifying any parent sides as the top level peer nodes. An appliance at any level below the top level may identify other peer nodes, such as child nodes which share the same parent node. Being full topology aware, the appliance may configure, perform or operate based on the topology. For example, the appliance may monitor services based on the topology. In another example, the appliance may establish and share metrics based on the topology.

At step 488, each of the appliances identifies parent and/or child information from the configuration. During, upon or after applying the site hierarchy configuration, the appliance, such as via configurator, may determine the site identifier and/or IP address of any site identified as a parent. In some embodiments, a direct parent of a site is identified via a configuration parameter, such as for example, -parentSite. In some embodiments, the appliance determines any site identified via a parent site identifier, including those Sites which are not a direct parent to the current appliance. During, upon or after applying the site hierarchy configuration, the appliance, such as via configurator, may determine the site identifier and/or IP address of any site identified or determined to be a child. For example, an configuration command that specifies a parent Site may include a site identifier and/or IP address of the node that is a child node.

At step 490, each of the appliances established metric exchange connection responsive to the GSLB site hierarchy represented by the configuration. Upon applying the GSLB site hierarchy configuration to the appliances deployed for the multi-sites, each of the sites and appliances thereof have a representation of the entire topology. Based on the recognized topology and the configuration of the appliance, each appliance may establish metric exchange connections with other appliances according to the site hierarchy. In some embodiments, an appliance of a child site establishes a connection with an appliance of a parent site. In some embodiments, an appliance of a parent Site establishes a connection with each child Site. In another embodiment, each appliance of peer Sites establishes a connection with each peer. In some embodiments, depending on and/or responsive to the topology, an appliance may not accept a connection from another appliance. For example, an appliance of a child Site to a first parent site may not accept a connection from a child Site of a second parent site. In this manner, the appliances for the multi-site deployment may more efficiently establish metric exchange connections and share metrics in manner driven by the topology.

E. GSLB Auto Synchronization

Figure 5A:
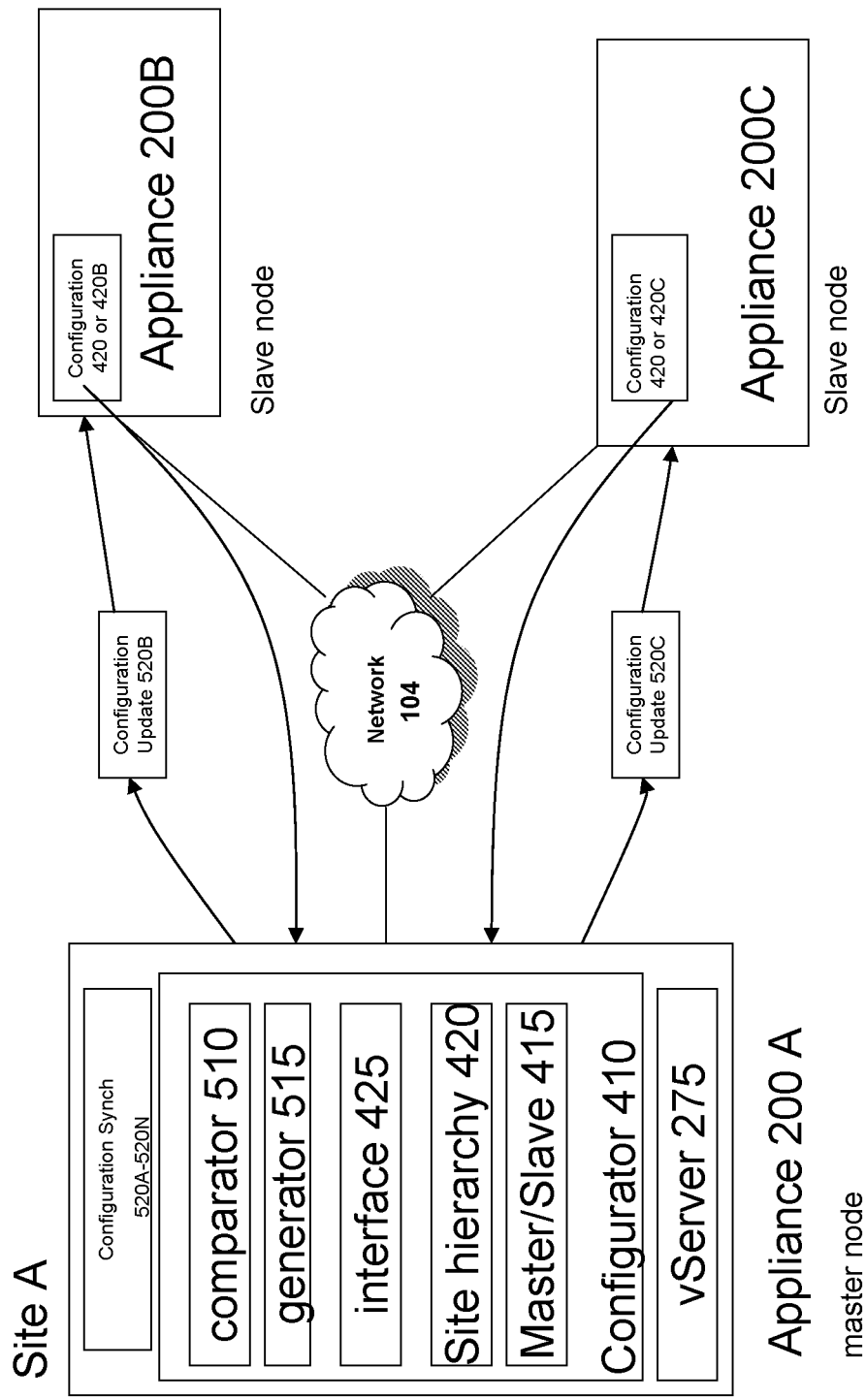
FIG. 5A is a block diagram of an embodiment of an appliance for synchronizing configurations among appliances.
Figure 5B:
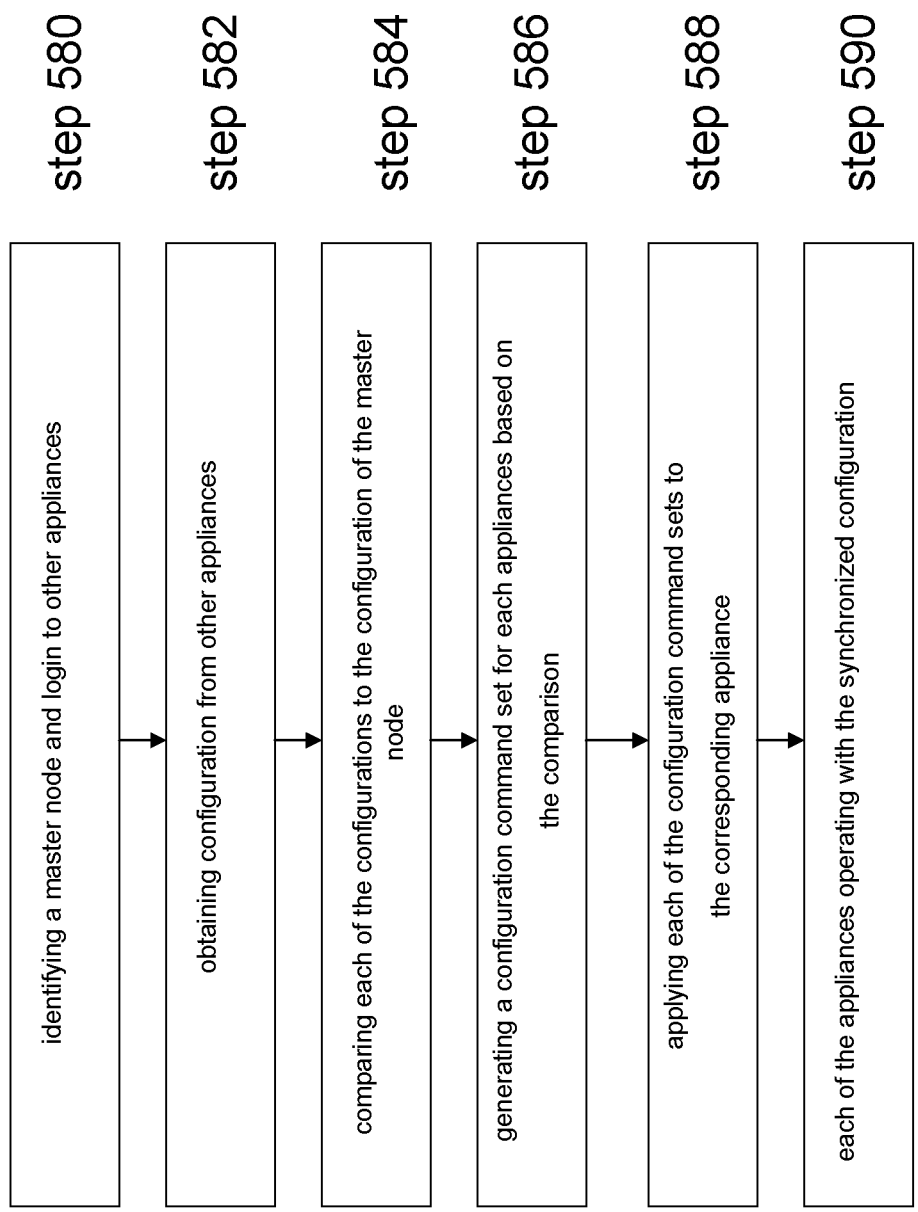
FIG. 5B is a flow diagram of an embodiment of steps of a method for synchronizing configurations among appliances.

Referring now to FIGS. 5A and 5B, systems and methods for synchronization configuration between appliances are depicted. A user driven approach may used to configure an appliance identified as a master node and synchronize that configuration of master node with other appliances. For example, as described in connection FIGS. 4A-4E, a user may configure a site hierarchy 420. With the systems and methods of FIGS. 5A and 5B, the user may synchronize each of the appliances of a multi-site deployment to use the site hierarchy configuration of the master node.

In a general over, this synchronization solution involves identifying a site as the master GSLB node. All the other nodes in the topology may automatically become slaves of this master node. The master node may get the currently running GSLB configuration of each of the slave nodes. For example, the master node may be configured to login to each of the slave nodes. Each of these configuration are compared with the currently running configuration of the master node. The master node generates a configuration command set for each slave node that can be applied on the slave node to get the GSLB configuration of the slave the same as the master node. The master node then applies each of these generates configuration command sets to the corresponding slave node.

Referring now to FIG. 5A, an embodiment of an appliance for synchronizing a configuration between appliances in a multi-appliance or multi-site deployment is depicted. In brief overview, appliances 200A, 200N and 200N may be deployed in a multi-site environment. Appliance 200A may be deployed at Site A while appliance 200B is deployed at Site B and appliance 200C, at Site C. In this example embodiment, appliance 200A may be designed via the master identifier 415 as a master node. A user may configure a site hierarchy 420 via the configuration 410. The interface 425 of the configuration may obtain the configurations 420B-C from each of appliance 200B and 200C. The comparator 510 compares each of the received configurations 420B and 430C with the configuration 420 of the master node. A generator 515 responsive to the comparator generates a configuration command set 520B and 520C for each appliance. The master node 200A may apply via the interface 435 each of these configuration command sets 520A-520N to the corresponding appliance to synchronize each slave appliance configuration with the master appliance configuration.

In further details, the configurator 410 may comprise any embodiments of the master/slave mechanism 415, site hierarchy 420 and the interface 425 described above in connection with FIGS. 4A-4E.

In further embodiments, the interface 420 may be designed and constructed to authenticate and/or login to an appliance using any authentication techniques and mechanism. In some embodiments, the appliance may be configured to use a user identifier and password to login via the interface to another appliance, such as via a second interface of a second appliance. In some embodiments, an appliance is configured with a predetermined user id and password pair to use to login to another appliance. For example, an appliance being logged into may include and identify a userid and password for any other appliance. In some embodiments, to avoid providing a password by the master to login each time to a slave, the appliances may have master-slave pairs to auto-login using any type and form of public-key authentication methods. In some embodiments, predetermined, special or internal user ids may be used that do not have passwords.

In some embodiments, the interface may comprise initiating or executing any type and form of script on an appliance. In some embodiments, the interface may execute a perl, awk or sed script. The interface may make any local or remote system calls, such as via the script or via an API. The interface may make system calls to an operating system of the appliance. In some embodiments, the interface may make an API call to any application or program of the appliance. In one embodiment, the interface uses a remote CLI functionality to access and obtain information from a remote appliance. In some embodiments, the configurator determinations that a slave or remote node is not to be synchronized. For example, one site node specifies via configuration or metric exchange that is not selected to be part of a synchronization process. In some embodiments, a site appliance may provide information indicating that the configuration on that appliance should not be changed. In one embodiment, a site appliance may provide information indicating that synchronization of the configuration on that appliance should be skipped.

The configurator of the master node, such as via the interface may automatically login to each slave node and use one or more remote calls, such as SSH, SFTP and/or SCP to retrieve the configuration from the slave node. Likewise, the configurator of the master node may automatically login to each slave node and via one or more remote calls, such as SSH, SFTP and/or SCP apply an updated configuration to each slave node. The configurator may determine a list of appliances or sites to retrieve a configuration via the site hierarchy configuration 420. For example, the configurator 420 may access and/or read from memory or storage the current site hierarchy configuration of the master node. In another embodiment, the configurator may execute a command to output the locally running site configuration 410. The configuration may capture this output. The configurator may order the list of slave nodes for obtaining the configuration in any order. In some embodiments, the configurator may enumerate the list of slave nodes by Site identifier and/or IP address. In another embodiment, the configurator may enumerate the list of slave nodes in accordance with the topology of the site, such as top peer nodes first, then child nodes of these top nodes next, and so on.

With an enumerated list of slave nodes, the configurator, such as via the interface, may login to each slave node and retrieve the current configuration. The configurator may obtain the userid and password or authentication credentials for a slave in the list. Each slave node may have the same or different credentials. Using the credentials, the configurator ma login to the appliance of the slave node. The configurator may execute a command on the slave node to output or provide the current running configuration of the appliance. The configuration may transfer or copy the slave node's configuration to the master node. For example, the configurator may execute a remote shell to output the GSLB site configuration of a remote node to a file and remote copy or file transfer the file to the master node.

The configurator may comprise any type and form of comparator 510 for comparing one configuration to another configuration. The comparator may comprise any of the software and/or hardware embodiments of the configurator described in conjunction with FIG. 4B. The comparator may comprise logic, functions or operations to perform a difference between each of the configuration commands of one configuration 420A to the configuration commands of a second configuration 420B. For example, the comparator may perform a command by command comparison. In some embodiments, the comparator identifies the configuration commands for a site in one configuration and compares the similarities and differences of the configurations commands for that site in a second configuration. The comparator may perform this comparison for each of the sites in the enumerated list of sites. In some embodiments, the comparator determines the site topology of each of the configurations being compared and outputs differences between the site topologies. In some embodiments, the comparator determines the site topology represented by each configuration and outputs those portions of the topology that are the same. In these embodiments, the comparator may compare the topologies of each configuration, such as via traversing any type and form of tree representation, such as a linked list or data structure in memory. The comparator 510 may output the results of the comparison in any form or format. In some embodiments, the comparator produces a file of the differences and/or similarities. In another embodiment, the comparator provides a data structure or an object comprising information of the differences and/or similarities. In some embodiments, the comparator provides the differences or similarities in the form of a site configuration 420.

The configurator 420 may comprise a generator 515 that generates, produces or provides a configuration command set 520A-520N to address any differences in configuration between compared configurations. The generator may comprise any of the software and/or hardware embodiments of the configurator described in conjunction with FIG. 4B. The generator 515 may operate responsively to the comparator 510 and/or any output produced by the comparator. In some embodiments, the generator operates responsively to any portion of the configurator 410, such as the interface 425 or a CLI or GUI.

The generator 515 may generate any commands or instructions 520A-520N that changes one configuration to match or synchronize with another configuration. For example, the generator may generate a set of configuration commands to change the configuration of a slave node to match or synchronize with the configuration of a master node. The generator may generate the configuration synchronization command set 520A-520N using the same command language, syntax or format for the site hierarchy configuration 420. The generator may generates commands, scripts or instructions as supported by the appliance. The command sets 520A-N may be any type and form of script, for example a script that may be executed via a CLI.

The commands sets 520 may include any commands, instructions or configuration to add sites, remove sites and/or change the configuration of a site or topology of the multi-site hierarchy. The command sets 520 may include any commands or instructions to change one or more parameters or options of a site configuration. The commands sets 520 may include any instructions to halt operations while making the changes. The commands sets 520 may include any instructions to backup or save copies of the current configuration. The commands sets 520 may include any instructions to set a rollback point of the configuration. In some embodiments, the commands set 520 are designed and generated such that the result of running the command set is a currently running configuration of a slave node matching or corresponding to the currently running configuration of a master node. In some embodiments, the commands set 520 are designed and generated such that the result of running the command set is a currently running GSLB site hierarchy configuration of a slave node matching or corresponding to the currently running GSLB site hierarchy configuration of a master node.

Each of the command sets may be the same or different. In some embodiments, each of the retrieved configurations of the slave nodes are different resulting in different command sets to synchronize each of the slave. In other embodiments, each of the retrieved configurations of the slave nodes are the same resulting in the same command sets to synchronize each of the slave. In another embodiment, some of the retrieved configurations of the slave nodes are the same and others are different resulting in some generated command sets being the same and other generated command sets being different.

The configurator via the interface 425 may apply the configuration commands sets to each slave appliance to synchronize the configurations. In some embodiments, the configurator synchronizes configurations responsive to the generator and/or comparator. In other embodiments, the configurator synchronizes configurations on a predetermined schedule. In some embodiments, the configurator synchronizes configurations based on a request from a slave node. In another embodiment, the configurator synchronizes configurations based on user input or responsive to a request of a user.

Referring now to FIG. 5B, an embodiment of steps of a method for synchronizing configurations between appliances is depicted. In brief overview, at step 580, a master node is identified and the master node logs in to slave nodes. At step 582, the master node obtains the configuration from these appliances. At step 584, the master node compares each of the obtained configurations to the configuration of the master node. At step 586, the master node generates a configuration command set for each appliance based on the comparison. at step 588, the master node applies each of the configuration commands to the corresponding appliances to synchronize configuration. At step 590, each of the appliances operate with the synchronized configuration.

In further details, at step 580, a user, such as an administrator, may identify any appliance of any site as a master node for configuring the site hierarchy. In some embodiments, the user identifies a top node as a master node. In another embodiment, the user identifies an appliance that is a child of a parent site as the master node. In some embodiments, the user identifies a plurality of appliances as master nodes. In some cases, an appliance is designated as a backup master node. In some embodiments, the user specifies via configuration of the appliance that the appliance is a master. In another embodiment, an appliance is considered a master node because the user configures the site hierarchy on that appliance.

The master node may be configured with or operating any type of GSLB site hierarchy. The site hierarchy of the master node may define or specify any topology with any combination of one or more peer sites, parent sites and/or child sites. In some embodiments, the user defines a site hierarchy with a single top node. In other embodiments, the user defines a site hierarchy with multiple peers nodes at the top of the hierarchy. The user may specify in the site hierarchy any number of levels of parent and child nodes. Each peer node may be a parent to any number of sites. Each site that is a child of a top node may also be parent node having any number of children and each child may further be a parent to any number of further children nodes.

At step 582, the master node may obtain site hierarchy configuration from one or more other appliances or slave nodes in the multi-site deployed represented by the master node's site hierarchy. In some embodiments, upon request of a user, the master node identifies the appliances and sites in the master's nodes site hierarchy. The master node may automatically login to each appliance using any predetermined authentication scheme. The master node may execute any shell or command line commands to obtain a site hierarchy configuration of each of slave nodes and transfer or copy the configuration to the master node. In some embodiments, the master node obtains these configurations concurrently. In other embodiments, the master node obtains these configurations subsequently. The master node may uniquely identify and store each configuration from each slave node in memory or storage. In some embodiments, the master node determines that one or more slave nodes should not be synchronized. For example, configuration on the master node or slave node may identify that a configuration of a slave node should not be changed or the slave node is not participating in synchronization. Responsive to this identification, any one or more steps of this method may be skipped or not performed.

At step 584, the master node such as via the comparator compares each of the obtained slave node configurations with the master's node configuration. In some embodiments, the master node performs this comparison upon receipt of the slave node's configuration. In other embodiments, the master node performs this comparison upon receipt of configurations from all identified slave nodes. In one embodiment, the master node performs the comparison with batches of a plurality of slave node configurations. In some embodiments, the master node determines if any of the slave node's configuration are the same and responsive to the determination performs a comparison once for the common configuration.

At step 586, the master node generates a configuration command set for each slave node configuration to synchronize the slave nodes configuration with the master nodes configuration. In some embodiments, the generator of the master node generates a configuration command set responsive to comparison by the comparator. In other embodiments, the generator of the master node generates a configuration command set for each slave node responsive to a user or user request.

At step 588, the master node applies the commands sets to synchronize configuration at each corresponding slave node. In some embodiments, the interface of master node applies the synchronization command sets responsive to the generator. In some embodiments, the interface of the master node applies the synchronization commands set upon generation. In other embodiments, the interface of the master node applies the synchronization command sets upon completion of comparison and/or generation of all identified slave nodes configuration. In some embodiments, the master node applies the synchronization command sets concurrently with each other. In other embodiments, the master node applies the synchronization command sets subsequently to each other. In some embodiments, the master node applies synchronization command sets in accordance with levels of the hierarchy starting from either the top node or a bottom leaf node.

At step 590, as a result of completing the synchronization of configurations among the appliances in a multi-site deployment, each of the appliances operates with at least a same portion of the site hierarchy of the master node. In some embodiments, each of the appliances operate with the same GSLB site hierarchy. In other embodiments, some of the appliances operates with the same GSLB site hierarchy while some other appliances operate with a portion of the same GSLB site hierarchy. Responsive to the updates or changes to the GSLB site hierarchy, any one appliance may changes the appliance's operation in view of the update or change. In some embodiments, one or more appliances may disestablish or drop a metric exchange connection. In another embodiment, one or more appliances may establish a metric exchange connection.

Although the embodiment of the method of FIG. 5B may at times be described in connection with a GSLB site hierarchy 420, the systems and methods described herein may be used for any type and form of configuration that may be common, shared or batchable across appliances.

Although the embodiment of the method of FIG. 5B is described in view of the master node obtaining configurations, performing comparison and generating configuration changes, each of the slave nodes may obtain the master nodes configuration, perform the comparison and generate and apply the configuration changes on the slave node.

What is claimed:

1. A method for configuring one or more global server load balancing (GSLB) appliances and one or more load balancing appliances via a single configuration to represent a GSLB site hierarchy, the method comprising:
   a) receiving, by each of a plurality of appliances, a single configuration representing a GSLB site hierarchy, comprising a plurality of levels, the GSLB site hierarchy comprising a plurality of sites, each site of the plurality of sites having one or more appliances of the plurality of appliances, each of the appliances deployed at a level of the plurality of levels;
   b) identifying, by a first appliance of the plurality of appliances, from the single configuration during configuration of the first appliance that the first appliance is a first node corresponding to a first GSLB site in the GSLB site hierarchy, the first appliance providing GSLB to the plurality of sites in the GSLB site hierarchy;
   c) identifying, by a second appliance of the plurality of appliances, from the single configuration during configuration of the second appliance that the second appliance is a second node corresponding to a second site in the GSLB site hierarchy, the second appliance providing load balancing for a plurality of servers at the second site in the GSLB site hierarchy;
   d) identifying, by the second appliance, from the single configuration during configuration of the second appliance that the first node of the first GSLB site is a parent node at a first level of the plurality of levels in the GSLB site hierarchy to the second node of the second appliance at the second site at a second level of the plurality of levels;
   e) establishing, by each of the plurality of appliances, a metric exchange connection with at least one appliance at a different level of the plurality of levels of the GSLB site hierarchy based on the topology of the GSLB site hierarchy to exchange load balancing statistics via transport layer connections; and
   f) exchanging, by each of the plurality of appliances, load balancing statistics with the at least one appliance at the different level of the plurality of levels of the GSLB site hierarchy based on the topology of the GSLB site hierarchy.

2. The method of claim 1, wherein step (a) further comprises receiving, by each of the plurality of appliances, the single configuration identifying peer GSLB nodes in the GSLB site hierarchy.

3. The method of claim 1, wherein step (a) further comprises receiving, by each of the plurality of appliances, the single configuration identifying one or more child nodes of one or more sites of the plurality of sites and a parent node of a GSLB site for each of the one or more sites.

4. The method of claim 1, wherein step (b) further comprises identifying, by the first appliance, from the single configuration one or more peer GSLB sites.

5. The method of claim 1, wherein step (c) further comprises identifying, by the second appliance, from the single configuration one or more parent nodes in the GSLB site hierarchy that are peer GSLB sites to the parent node of the second site of the second appliance.

6. The method of claim 1, wherein step (c) further comprises identifying, by the second appliance, from the single configuration one or more child nodes in the GSLB site hierarchy that are child nodes to a third site.

7. The method of claim 1, wherein step (d) further comprises identifying, by the second appliance, from the single configuration a second child node to the parent node of the second appliance.

8. The method of claim 1, further comprising establishing, responsive to the single configuration, a metric exchange connection between the first appliance and the second appliance.

9. The method of claim 1, further comprising not accepting, by the second appliance responsive to the single configuration, a request for a metric exchange connection from a child node in a second site in the plurality of sites.

10. The method of claim 1, wherein step (c) further comprises establishing, responsive to the single configuration, a metric exchange connection between the first appliance and one or more appliances that are peer nodes of the first GSLB site.

11. A system for configuring one or more global server load balancing (GSLB) appliances and one or more load balancing appliances via a single configuration to represent a GSLB site hierarchy the system comprising:
   a plurality of appliances of one or more networks, each of the plurality of appliances having a configuration interface for receiving a configuration representing a GSLB site hierarchy, comprising a plurality of levels, the GSLB site hierarchy comprising a plurality of sites, each site of the plurality of sites having one or more appliances of the plurality of appliances, each appliance at a level of the plurality of levels;
   a first appliance of the plurality of appliances identifying during configuration of the first appliance from a single configuration received by the first appliance that the first appliance comprises a first node corresponding to a first GSLB site in the GSLB site hierarchy, the first appliance providing GSLB for a plurality of sites in the GSLB site hierarchy; and a second appliance of the plurality of appliances identifying during configuration of the second appliance from the single configuration that the second appliance comprises a second node corresponding a second site in the GSLB site hierarchy that provides load balancing for a plurality of servers at the second site and identifying during configuration of the second appliance from the single configuration that the first node of first GSLB site of the first appliance, at a first level of the plurality of levels, is a parent node in the GSLB site hierarchy to the second node of the second appliance at the second site at a second level of the plurality of levels;

wherein each of the plurality of appliances establishes a metric exchange connection with at least one appliance at a different level of the plurality of levels of the GSLB site hierarchy based on the topology of the GSLB site hierarchy to exchange load balancing statistics via transport layer connections and exchanges load balancing statistics with the at least one appliance at the different level of the plurality of levels of the GSLB site hierarchy.

12. The system of claim 11, wherein the configuration interface of each of the plurality of appliances receives the single configuration identifying peer GSLB nodes in the GSLB site hierarchy.

13. The system of claim 11, wherein the configuration interface of each of the plurality of appliances receives the single configuration identifying one or more child nodes of one or more sites of the plurality of sites and a parent node of a GSLB site for each of the one or more sites.

14. The system of claim 11, wherein the first appliance identifies from the received single configuration one or more peer GSLB sites.

15. The system of claim 11, wherein the second appliance identifies from the received single configuration one or more parent nodes in the GSLB site hierarchy that are peer GSLB sites to the parent node of the second site of the second appliance.

16. The system of claim 11, wherein the second appliance identifies from the received single configuration one or more child nodes in the GSLB site hierarchy that are child nodes to a third site.

17. The system of claim 11, wherein the second appliance identifies from the received single configuration a second child node to the parent node of the second appliance.

18. The system of claim 11, wherein the first appliance and the second appliance establish responsive to the single configuration, a metric exchange connection between the first appliance and the second appliance.

19. The system of claim 11, wherein the second appliance responsive to the single configuration does not accept a request for a metric exchange connection from a child node in a second site in the plurality of sites.

20. The system of claim 11, wherein step (c) further comprises establishing, responsive to the single configuration, a metric exchange connection between the first appliance and one or more appliances that are peer nodes of the first GSLB site.

* * * * *